US012573164B2

(12) United States Patent (10) Patent No.: US 12,573,164 B2
Yamashita et al. (45) Date of Patent: Mar. 10, 2026

(54) DEVICE, PRODUCTION METHOD, AND STORAGE MEDIUM STORING DESIGN PROGRAM

(71) Applicant: SEIKO EPSON CORPORATION, Tokyo (JP)

(72) Inventors: Mitsuhiro Yamashita, Matsumoto (JP); Takuya Ono, Shiojiri (JP); Yuji Ishikawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 130 days.

(21) Appl. No.: 18/406,280

(22) Filed: Jan. 8, 2024

(65) Prior Publication Data

US 2024/0242454 A1 Jul. 18, 2024

(30) Foreign Application Priority Data

Jan. 12, 2023 (JP) ................................. 2023-002933

(51) Int. Cl.
*G06T 19/20* (2011.01)
*G06T 11/60* (2006.01)
(52) U.S. Cl.
CPC .............. *G06T 19/20* (2013.01); *G06T 11/60* (2013.01)
(58) Field of Classification Search
CPC ................................ G06T 19/20; G06T 11/60
USPC ........................................................ 345/419
See application file for complete search history.

(56) References Cited

U.S. PATENT DOCUMENTS

| | | | |
|---|---|---|---|
| 8,174,539 B1 * | 5/2012 | Samaniego ........... | G06T 11/001 345/581 |
| 2005/0168459 A1 * | 8/2005 | Baird ................... | B65D 5/4216 715/964 |
| 2007/0055401 A1 * | 3/2007 | Van Bael ................ | G06F 30/00 700/98 |
| 2007/0083383 A1 * | 4/2007 | Van Bael ................ | G06F 30/00 715/772 |
| 2015/0351477 A1 * | 12/2015 | Stahl ....................... | G06T 15/04 700/132 |
| 2022/0214844 A1 | 7/2022 | Tsuchiya et al. | |
| 2023/0069318 A1 * | 3/2023 | Sweeney ................. | H04L 63/20 |
| 2023/0186533 A1 * | 6/2023 | Graham .................. | G06T 11/60 382/284 |

FOREIGN PATENT DOCUMENTS

JP 20220106474 A1 4/2022

* cited by examiner

*Primary Examiner* — Jin Ge
(74) *Attorney, Agent, or Firm* — CHIP LAW GROUP

(57) ABSTRACT

A design device for designing a print includes a design section configured to design the print according to an instruction of a user, a three-dimensional display section configured to cause a three-dimensional preview of the designed print to be displayed, and an unrolled display section configured to cause an unrolled preview of the designed print to be displayed. Both the three-dimensional preview and the unrolled preview are simultaneously visibly displayed, and a result of a predetermined operation performed by a user on one of the three-dimensional preview and the unrolled preview is reflected on both the three-dimensional preview and the unrolled preview.

8 Claims, 19 Drawing Sheets

SELECT

V2

¥1,600

BACKGROUND COLOR

DESIGN

STAMP

TEXT

CANCEL

SELECT

¥1,600

V2

BACKGROUND COLOR

DESIGN

STAMP

TEXT

CANCEL

SELECT

V2

¥1,600

BACKGROUND COLOR

DESIGN

STAMP

TEXT

CANCEL

DEVICE, PRODUCTION METHOD, AND STORAGE MEDIUM STORING DESIGN PROGRAM

The present application is based on, and claims priority from JP Application Serial Number 2023-002933, filed Jan. 12, 2023, the disclosure of which is hereby incorporated by reference herein in its entirety.

BACKGROUND

1. Technical Field

The present disclosure relates to a design device, a production method, and a storage medium storing a design program.

2. Related Art

A technique of displaying a plurality of images of a three-dimensional object when viewed in a plurality of directions (for example, JP-A-2022-106474) is known.

It is desirable to provide a design device that enables a user to easily design a pattern for the surface of a three-dimensional object even if the user has limited design skills.

SUMMARY

According to an aspect of the present disclosure, a design device for designing a print includes a design section configured to design the print according to an instruction of a user, a three-dimensional display section configured to cause a three-dimensional preview of the designed print viewed from a predetermined viewpoint to be displayed, and an unrolled display section configured to cause an unrolled preview of the designed print mapped onto a two-dimensional plane to be displayed. The three-dimensional display section and the unrolled display section are configured to cause both the three-dimensional preview and the unrolled preview to be simultaneously visibly displayed, and the three-dimensional display section and the unrolled display section are configured to cause a result of a predetermined operation performed by a user on one of the three-dimensional preview and the unrolled preview to be reflected on both the three-dimensional preview and the unrolled preview.

According to another aspect of the present disclosure, a production method includes receiving a design of a user, causing a display device to display a three-dimensional preview of a designed print viewed from a predetermined viewpoint, causing the display device to display an unrolled preview of the designed print mapped onto a two-dimensional plane, receiving a production start instruction of the user, and producing the print designed according to the production start instruction of the user by controlling a production device. Both the three-dimensional preview and the unrolled preview are displayed simultaneously visibly, and a result of a predetermined operation of a user performed on one of the three-dimensional preview and the unrolled preview is reflected on both the three-dimensional preview and the unrolled preview.

According to another aspect of the present disclosure, a non-transitory computer-readable storage medium storing a design program that causes a computer to execute a design function of receiving a design of a user, a three-dimensional display function of causing a display device to display a three-dimensional preview of a designed print viewed from a predetermined viewpoint, an unroll display function of causing the display device to display an unrolled preview of the designed print mapped onto a two-dimensional plane, a reception function of receiving a production start instruction of the user, and a production function of causing a production device to produce the print designed according to the production start instruction of the user. Both the three-dimensional preview and the unrolled preview are displayed simultaneously visibly, and a result of a predetermined operation of a user performed on one of the three-dimensional preview and the unrolled preview is reflected on both the three-dimensional preview and the unrolled preview.

BRIEF DESCRIPTION OF THE DRAWINGS

FIG. 10 depicts the example of enlarging the display of the three-dimensional preview in response to the operation onto the unrolled preview.
FIG. 13 depicts an example of enlarging the display of the unrolled preview in response to an operation onto the three-dimensional preview.
FIG. 16 depicts the example of enlarging the display of the three-dimensional preview in response to the operation onto the unrolled preview.
FIG. 19 depicts an example of changing the display location of the unrolled preview in response to an operation onto the three-dimensional preview.
FIG. 20 depicts the example of changing the display location of the unrolled preview in response to the operation onto the three-dimensional preview.

DESCRIPTION OF EMBODIMENTS

Embodiments of the present disclosure will be described here according to the following order.
1. Configuration of Printing System 1-1. Configuration of Server
1-2. Configuration of Terminal
1-3. Configuration of Printer
2. Entire Sequence
2-1. Design Process
3. Other Embodiments

1. CONFIGURATION OF PRINTING SYSTEM

Figure 1:
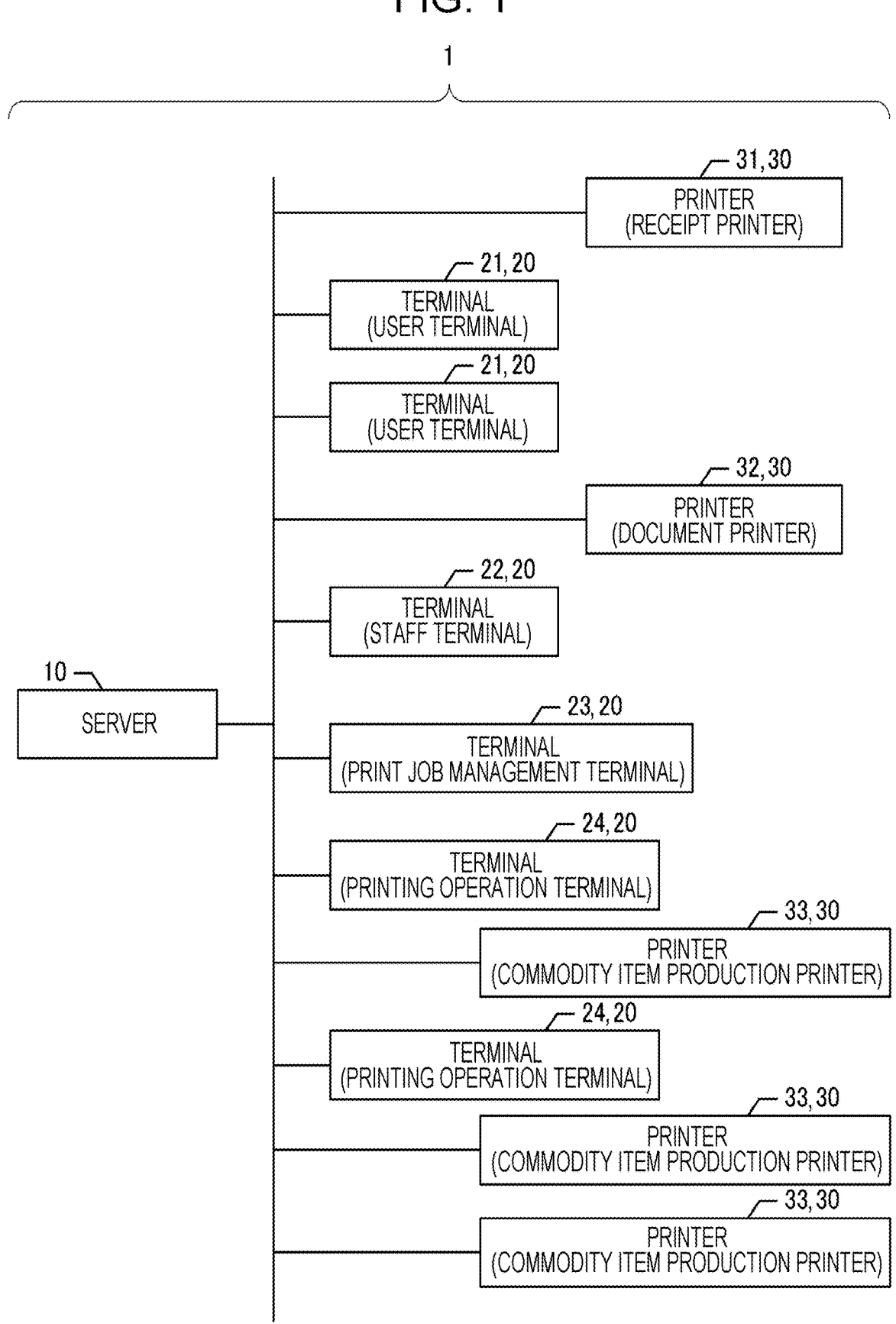
FIG. 1 is a block diagram of a printing system.

FIG. 1 is a diagram schematically illustrating an example of a printing system 1 including terminals 20 serving as a design device according to an embodiment of the present disclosure. The printing system 1 includes a server 10, terminals 20, and printers 30. The number of devices illustrated in the figure is exemplary and the number of devices is not limited. For example, the numbers of terminals 20 and printers 30, which are illustrated as a plurality of terminals 20 and a plurality of printers 30, are not limited to the numbers illustrated in FIG. 1, and a plurality of servers 10, a single one of which is illustrated in the figure, may be provided. These devices are capable of communicating with each other via a network. The network is not limited to a specific design and may be, for example, a local network or a network in which devices at physically distinct locations communicate with each other via, for example, the Internet.

In the present embodiment, the terminal 20 and the printer 30 are disposed, by way of example, in a store such as a photo studio or a variety store. The store provides a printing service of printing, onto user-selected commodity items (such as mugs, T-shirts, smartphone cases, pinback buttons, or paper of various sizes and materials), an image that is represented by data and designed by using a photograph specified by a user who is a customer of the store, thereby enabling the user to make a commemorative gift or a customizable item.

The terminals 20 include a terminal (a user terminal 21) used for designing by a user who is a customer of the store, a terminal (a staff terminal 22) used by a staff member who serves the user, a terminal (a print job management terminal 23) for management of print jobs, and a terminal (a printing operation terminal 24) in which a printer driver for each printer and printing applications are installed and that is used by a printing operator.

The printers 30 include a receipt printer 31 for printing a reference number of a provisional order, a document printer 32 for printing an order sheet, and a commodity item production printer 33 for printing an image represented by design data and designed by a user for a commodity item selected by the user. Examples of the commodity item production printer 33 include a mini-lab machine suitable for printing on photographic paper, a sublimation transfer printer capable of printing on sublimation transfer paper for pressure bonding for mugs (ceramics), pinback buttons, and smartphone cases, a wide-format printer suitable for printing on a paper medium such as posters, and a direct-to-garment (DTG) printer capable of printing directly on fabric products such as T-shirts. A printer that performs printing directly on mugs (ceramics), pinback buttons, and smartphone cases may be included.

A user operates the user terminal 21 to design an image for printing on commodity items and represent the image as data using a design application (design programs) installed in the user terminal 21. The user may specify the number of copies and request that an image designed by himself and represented by data be formed on a selected commodity item.

Users may freely design an image for printing and representing the image as data using the design application in the user terminal 21; however, operations of designing are not easy in some cases for some of the users who are not accustomed to designing a pattern to be formed on the surface of a three-dimensional object. Therefore, the design application in the present embodiment has functions capable of simultaneously displaying both a preview (three-dimensional preview) as a three-dimensional image of a three-dimensional object and a preview (unrolled preview) of an unrolled image of the surface of the three-dimensional object.

Figure 2:
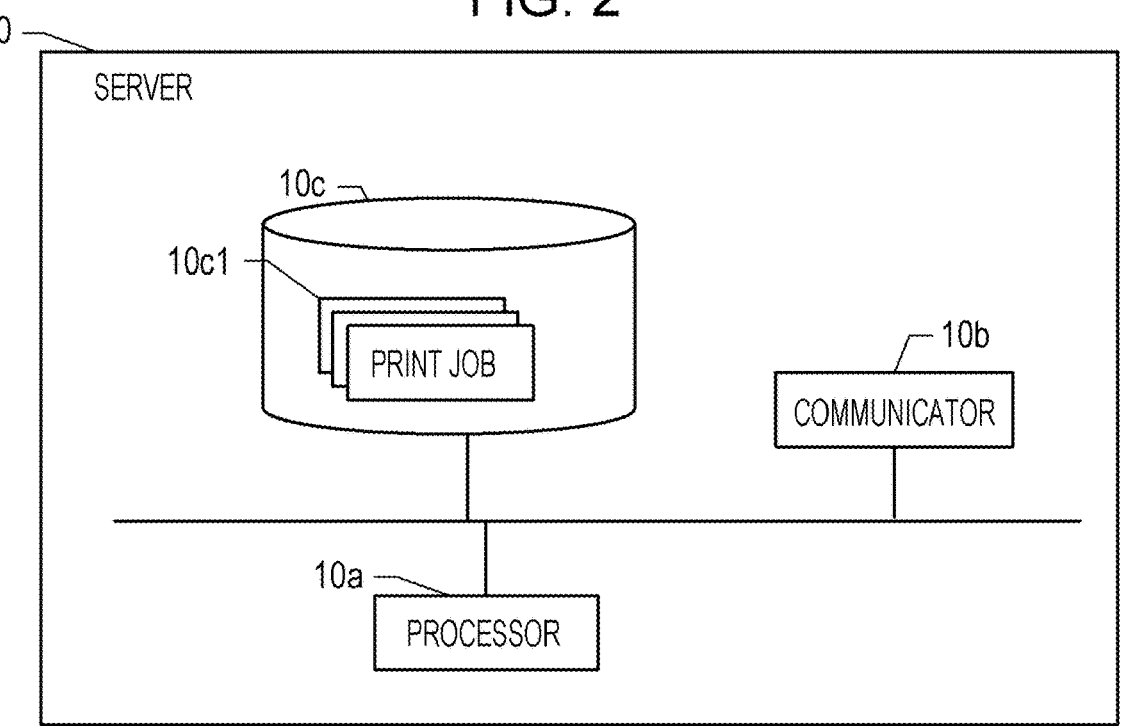
FIG. 2 is a block diagram of a server.

Hereafter, the configurations of devices of the printing system 1 for implementing such functions will be described.
1-1. Configuration of Server FIG. 2 is a block diagram illustrating an example of a configuration of the server 10. The server 10 includes a processor 10a, a communicator 10b, and a nonvolatile memory 10c. The processor 10a includes a central processing unit (CPU), a random-access memory (RAM), a read-only memory (ROM), and other components, which are not illustrated, and executes various programs recorded in the nonvolatile memory 10c to be able to control components of the server 10 and devices coupled to a network. The processor 10a may be a single chip, may include a plurality of chips, or may be configured, together with various functional blocks for operating a printer, as a system on a chip (SoC). In addition, an application-specific integrated circuit (ASIC) may be employed, for example, instead of the CPU, and the configuration may be such that the CPU and the ASIC cooperate with each other. When each device in the present embodiment includes a processor, the processor may be implemented in various forms as in the case of the processor 10a.

The communicator 10b includes a communication interface for communicating with external devices according to various wired or wireless communication protocols. The server 10 is capable of communicating with another device via the communicator 10b. The communicator 10b may include an interface for communicating with various removable memories attached to the server 10.

Figure 3:
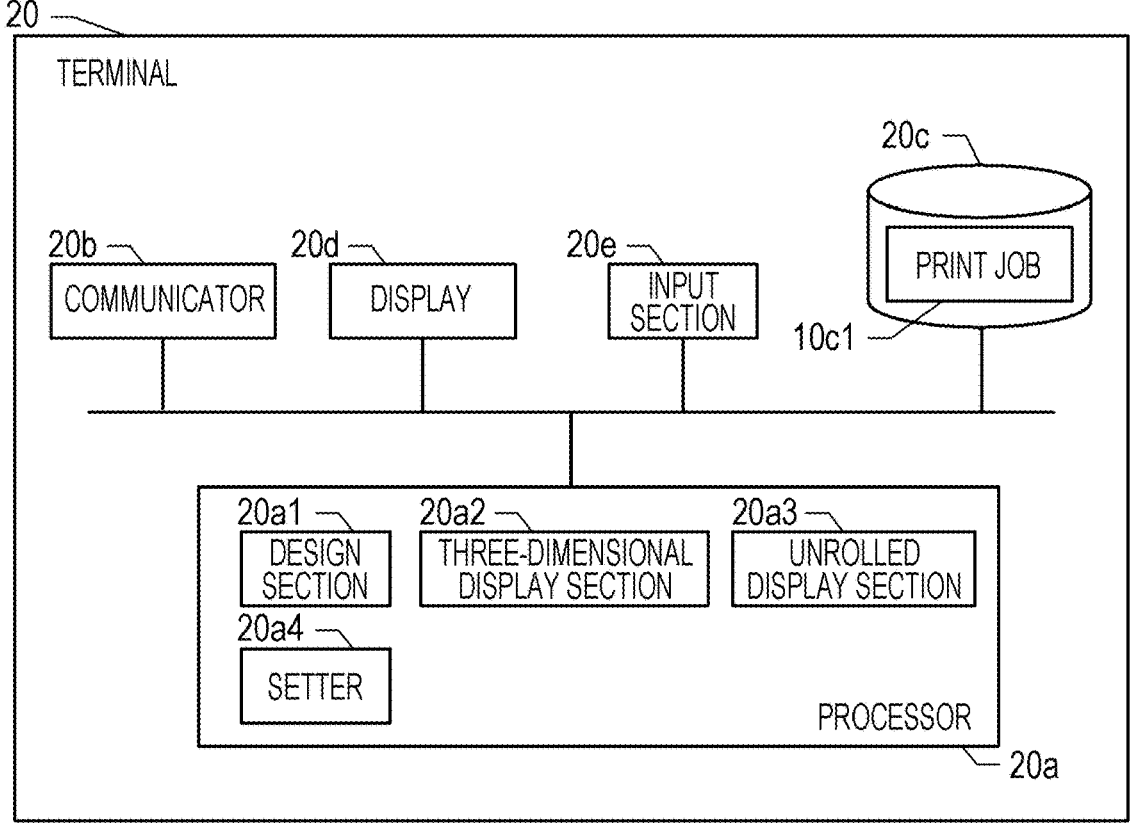
FIG. 3 is a block diagram of a terminal.

Various types of information including the print job 10cl are accumulated in the nonvolatile memory 10c of the server 10. The print job 10cl as used herein includes design data generated according to a design of a user, the type of a commodity item, the number of copies, and so on. The print job 10cl is generated at first in the user terminal 21. The content of the print job 10cl is updated in some cases in the staff terminal 22. In addition, in the print job management terminal 23 and the printing operation terminal 24, specific information (for example, printer information and the values of printing settings) for performing printing is added to the print job 10cl.
1-2. Configuration of Terminal The configuration of the terminal 20 will now be described. The hardware configuration of the terminal 20 is common among the user terminal 21, the staff terminal 22, the print job management terminal 23, and the printing operation terminal 24, and therefore the configuration of the terminal 20 will be described with reference to FIG. 3. The terminal 20 includes a processor 20a, a communicator 20b, a nonvolatile memory 20c, a display 20d, and an input section 20e. The processor 20a includes a CPU, a RAM, a ROM, and other components, which are not illustrated, and executes various programs recorded in the nonvolatile memory 20c to be able to control components of the terminal 20.

The communicator 20b includes a communication interface for communicating with external devices according to various wired or wireless communication protocols. The terminal 20 is capable of communicating with another device via the communicator 20b. In addition, the communicator 20b includes an interface for communicating with various removable memories attached to the terminal 20.

The display 20d is a display device that displays any image. The input section 20e is a device with which a user performs input operations, and, for example, includes a keyboard, a mouse, a touch panel, and so on. In any case, the user may input instructions by operating the input section 20e while visually recognizing an image displayed on the display 20d. In the present application, the term "image" denotes a visually recognizable item and is a broad concept including characters, lines, and so on.

In the present embodiment, by executing a design application (design program), the processor 20a of the user terminal 21 functions as a design section 20a1 configured to design a print according to a user instruction, a three-dimensional display section 20a2 configured to cause a three-dimensional preview of the designed print viewed from a predetermined viewpoint to be displayed, an unrolled display section 20a3 configured to cause an unrolled preview of the designed print mapped onto a two-dimensional plane to be displayed, and a setter 20a4 configured to set the follow functions of previews described later to on or off. Therefore, in the present embodiment, the user terminal 21 corresponds to the design device. The design application may be executed using another terminal (for example, the staff terminal 22, the print job management terminal 23, the printing operation terminal 24, or the like), in which case the processor of the other terminal functions as the design section, the three-dimensional display section, the unrolled display section, and the setter.

By operating the staff terminal 22, a staff member performs, together with the user, a content verification operation for the print job 10cl received from the server 10 and, with consent of the user, may issue an instruction for finalizing the order (final order). On this occasion, the staff member may change the content of the print job, such as the number of copies, and may issue an instruction for finalizing an order with the changed content.

In response to receiving a printing instruction from the server 10, the print job management terminal 23 selects the printing operation terminal 24 corresponding to the commodity item production printer 33 that executes a print job, and transmits the print job to the printing operation terminal 24. Selection of the printing operation terminal 24 may be performed manually by a printing operator. In the printing operation terminal 24, a printer driver and a printing application for each of the commodity item production printers 33 are installed. The printing operator may use these programs to perform various front-end operations such as color matching prior to printing. The printing operation terminal 24 and the commodity item production printer 33 may correspond one to one to each other, or a single printing operation terminal 24 may correspond to a plurality of commodity item production printers 33. The plurality of commodity item production printers 33 may be printers of the same model or may be printers of different models. In the single printing operation terminal 24, printer drivers for the commodity item production printers 33 of a plurality of models and a plurality of types of printing applications may be installed.

By operating the printing operation terminal 24, the printing operator selects the commodity item production printer 33 that performs printing of a print job (selection of an individual printer) and selects print settings to be used for printing of the print job. These selections may be performed on the print job management terminal 23. For example, the processor 20a of the print job management terminal 23 or the printing operation terminal 24 presents a list of the commodity item production printers 33 that are able to execute a print job, and obtains the commodity item production printer 33 selected from the list by the printing operator. In addition, for example, the processor 20a of the print job management terminal 23 or the printing operation terminal 24 presents a list of a plurality of options for print settings regarding execution of a print job, and obtains the print settings selected from the list by the printing operator. In the printing operation terminal 24, the design data of a print job is converted to a print format on the specified commodity item production printer 33 based on the print settings, and print data generated as a result of conversion is output together with information on the number of prints to the commodity item production printer 33. Upon completion of printing, the printing operation terminal 24 notifies the server 10 via the print job management terminal 23 of the progress information indicating completion of printing.

1-3. Configuration of Printer

Figure 4:
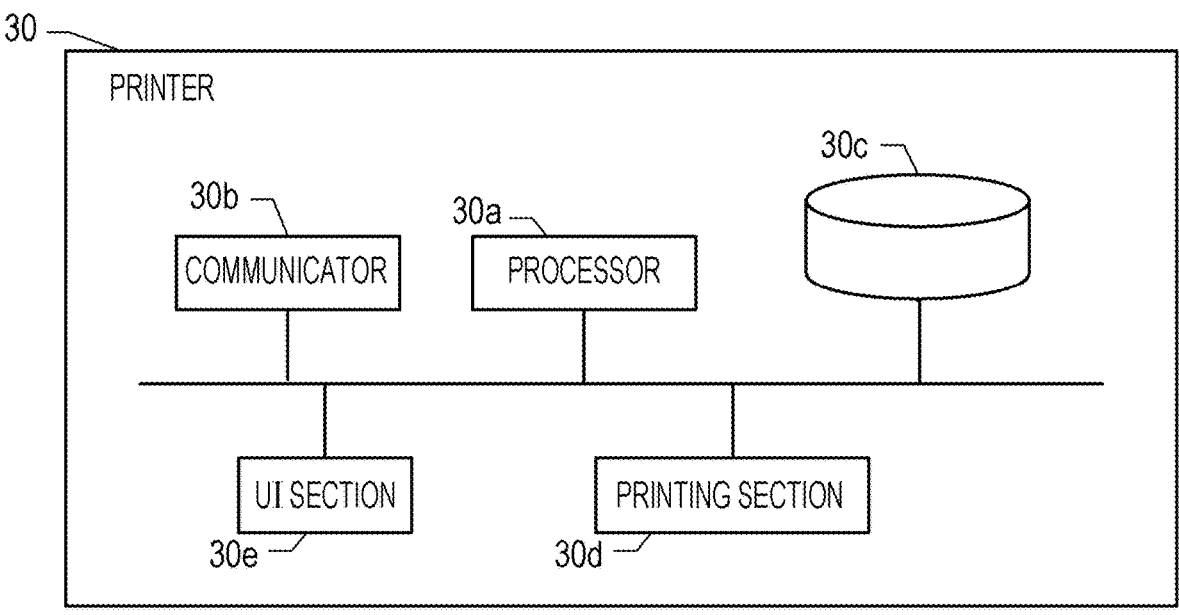
FIG. 4 is a block diagram of a printer.

FIG. 4 is a block diagram illustrating a configuration of the printer 30. The printer 30 includes a receipt printer 31, a document printer 32, and a printer 33 that performs printing on a commodity item. The printer 30 includes a processor 30a, a communicator 30b, a nonvolatile memory 30c, a printing section 30d, and a user interface (UI) section 30e. The processor 30a includes a CPU, a RAM, a ROM, and other components, which are not illustrated in the figure, and is capable of executing various programs recorded in the nonvolatile memory 30c to control components of the printer 30.

The communicator 30b includes a communication interface for communicating with external devices according to various wired or wireless communication protocols. The printer 30 is capable of communicating with another device via the communicator 30b. The communicator 30b may include an interface for communicating with various removable memories attached to the printer 30.

The printing section 30d differs for the receipt printer 31, the document printer 32, and the commodity item production printer 33. The printing section 30d, which is a part that carries out printing, performs printing on various types of media including regular paper, photographic paper, sublimation transfer paper, and cloths using various printing methods including an ink jet method. For example, the printing section 30d of the receipt printer 31 performs printing on roll paper with a predetermined selected sheet width as a receipt. The printing section 30d of the document printer 32 performs printing on, for example, cut sheets of a size such as A4. The printing section 30d of the commodity item production printer 33 performs printing on various three-dimensional or sheet-like print media handled by stores. The printing section 30d includes an actuator and various devices for carrying out printing on various media, sensors, driving circuits, and machine parts. The sensors include a sensor that detects various types of detection targets that may change in the printer 30. Examples of the detection targets include, but not limited to, a sensor that detects the remaining volume of media and a sensor that detects the remaining amount of ink for each color used for printing.

The UI section 30e includes at least any of a touch panel display, various types of keys and switches, and lightemitting diodes (LEDs). The touch panel display includes a display panel for displaying various types of information, such as the status of the printer 30 and the remaining amount of ink, and a touch detection panel overlapping the display panel, and detects a touch operation. The LEDs light or flash to indicate, for example, the status of the printer 30. The processor 30a may obtain an operation content performed by a staff member via the UI section 30e. In addition, the processor 30a may cause various types of information to be displayed on the display of the UI section 30e, thereby notifying the staff member of the information.

In the present embodiment, the commodity item production printer 33 produces a print according to an order from the user and a printing instruction of a staff member in a store such as a photo studio or a variety store. The processor 30a of the commodity item production printer 33 obtains print data converted to the print format of the commodity item production printer 33 via the communicator 30b, controls the printing section 30d based on the print data, and performs printing. Upon completion of printing, the processor 30a outputs progress information, which indicates completion of printing, via the communicator 30b. This information is transmitted via the printing operation terminal 24 and the print job management terminal 23 to the server 10.

2. ENTIRE SEQUENCE

Figure 5:
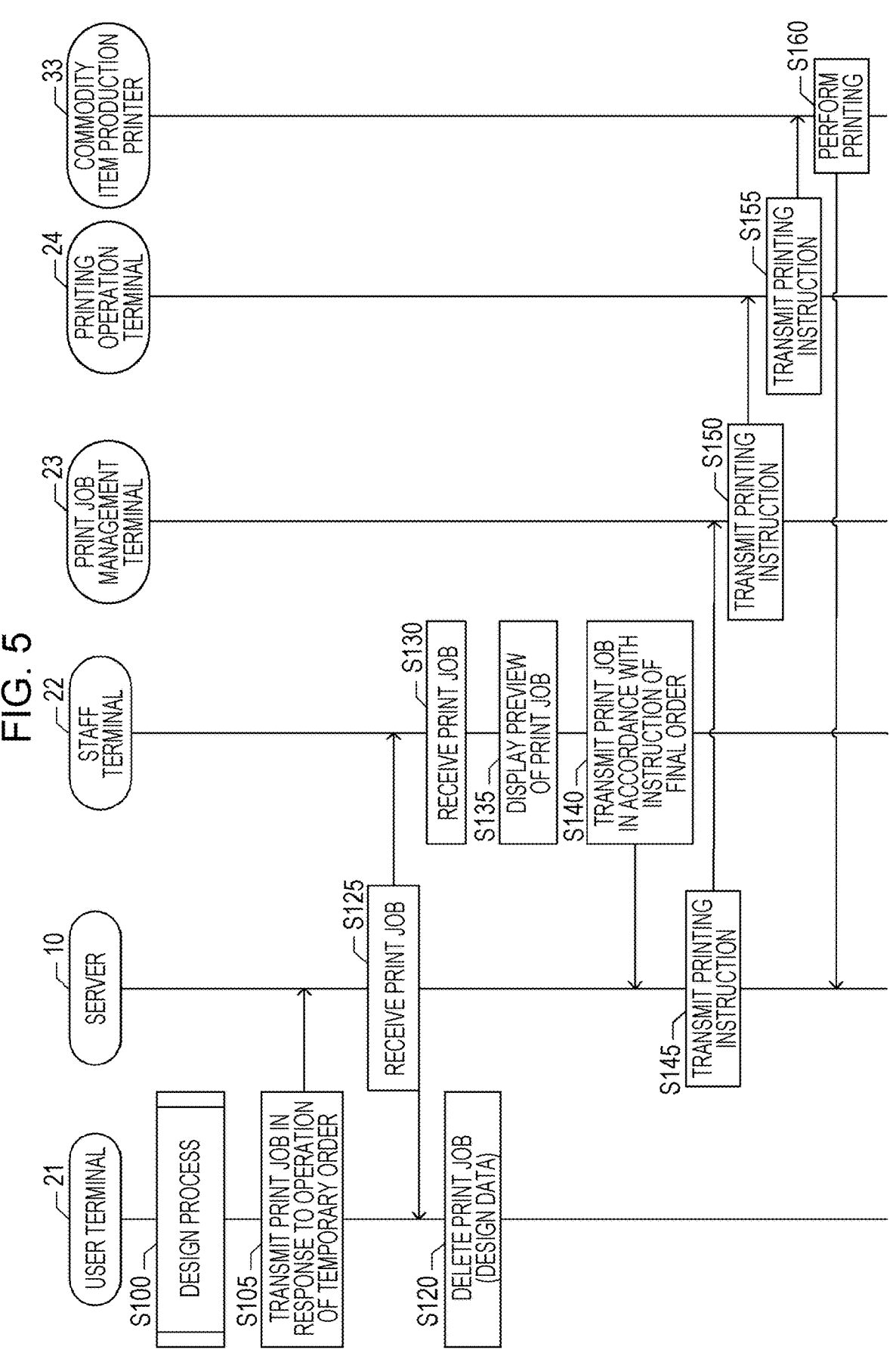
FIG. 5 is a sequence diagram of the entire sequence.

FIG. 5 is a sequence diagram illustrating the entire sequence performed in the printing system 1. When the user starts the design application in the user terminal 21, the entire sequence illustrated in FIG. 5 begins. That is, when a user starts the design application in the user terminal 21, the processor 20a of the user terminal 21 performs a design process described later (step S100). That is, the processor 20a of the user terminal 21 receives a design instruction issued by the user and causes the display 20d to display a three-dimensional preview and an unrolled preview described later.

Subsequently, when the user performs an operation of placing a provisional order for production of prints using design data generated through the design process, the processor 20a of the user terminal 21 transmits a print job in response to the operation (step S105). That is, the processor 20a of the user terminal 21 receives a specification, for example, for the number of copies and transmits a print job (including the design data, the type of a commodity item, the number of copies, and so on) to the server 10.

When the server 10 receives the print job from the user terminal 21 (step S125), the processor 10a of the server 10 notifies the user terminal 21 of the successful receipt. In response to the notification, the processor 20a of the user terminal 21 deletes the print job from the user terminal 21 (step S120). At step S125, the processor 10a of the server 10 transmits the print job received from the user terminal 21 to the staff terminal 22. In the present embodiment, at this point, the processor 10a of the server 10 assigns a reference number to the print job for the provisional order and outputs print data indicating the reference number to the user terminal 21. Although not illustrated in the figure, the user terminal 21 outputs the print data to the receipt printer 31 to cause the receipt printer 31 to print a receipt including the reference number. The user receives the printed receipt from the receipt printer 31 and moves to a reception counter.

The processor 20a of the staff terminal 22 receives the print job (step S130). At this point, the processor 20a identifies the print job for the provisional order, which has been placed by the user, by the reference number, which has been given together with the print job by the server 10, and selects the identified print job from a job list. The processor 20a of the staff terminal 22 causes the display 20d of the staff terminal 22 to display a preview of the print job selected by a staff member. The staff member, together with the user, confirms the content of the provisional order, such as the number of copies and the design. The staff member may change, for example, the number of copies according to an instruction of the user to update the print job. The staff member provides an instruction for a final order according to the instruction (production start instruction) of the user, and the processor 20a of the staff terminal 22 transmits a print job according to the instruction for the final order (step S140). That is, the processor 20a of the staff terminal 22 transmits a print job indicating the order content of the final order to the server 10. If no modification is added to the provisionally ordered print job, it is sufficient to transmit an instruction for a final order, and retransmission of a print job without a change may be omitted.

Although not illustrated in the figure, at this point, the staff terminal 22 generates an order sheet indicating the content of the final order, transmits the order sheet to the document printer 32, and causes the order sheet to be printed. The staff member gives the order sheet to the user, and the user receives the order sheet. The order sheet is available, for example, in order that when the user receives a complete print, the user presents the order sheet to a staff member at a product delivery counter and the staff member performs matching of the user and the print.

Upon receiving the finally ordered print job, the server 10 transmits a printing instruction for the print job to the print job management terminal 23 (step S145). In response to receiving the printing instruction for the print job from the server 10, the processor of the print job management terminal 23 selects the commodity item production printer 33 in accordance with the type of a commodity item indicated by the print job and transmits the printing instruction for the print job to the printing operation terminal 24 in which an application and a printer driver compatible with the selected commodity item production printer 33 are installed (step S150).

When the printing operation terminal 24 receives the printing instruction, a printing operator operates the printing operation terminal 24 to transmit the printing instruction to the commodity item production printer 33 that handles the print job (step S155). The printing operation terminal 24 convers the design data included in the print job to print data in a format suitable for printing with a printer based on the print settings and transmits the printing instruction together with the print data to the printer.

The commodity item production printer 33 that has received the printing instruction performs printing based on the received print data (step S160). Upon completion of printing, the commodity item production printer 33 notifies the server 10 via the printing operation terminal 24 and the print job management terminal 23 of the completion of printing. If back end tasks are desirable for the print job, a printing operator performs back end tasks for the print medium after printing to complete the print. For example, in the present embodiment, when the commodity item is a mug, printing is performed on sublimation transfer paper at step S160. The printed sublimation transfer paper is pressed onto the mug using a pressing machine by the printing operator. If the front end tasks are desirable, the front end tasks are performed prior to printing at step S155. The staff member may deliver the completed print to the user.

2-1. Design Process

Figure 6:
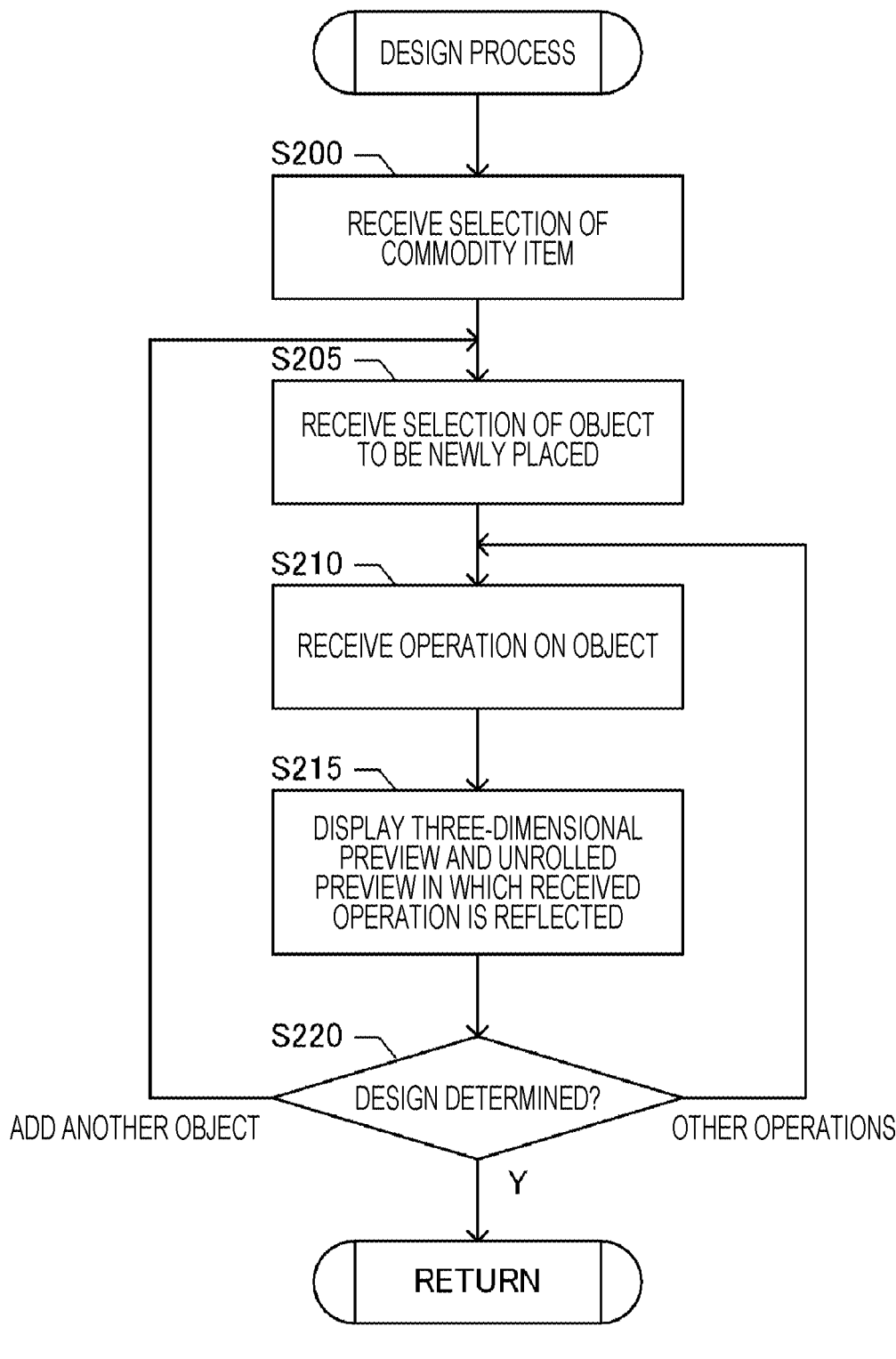
FIG. 6 is a flowchart of a design process.

The design process performed by the user terminal 21 at step S100 of the entire sequence described with reference to FIG. 5 is now described in detail with reference to FIG. 6. In the design process, first, the function of the design section 20a1 enables the processor 20a of the user terminal 21 to receive selection of a commodity item (step S200). Specifically, the processor 20a causes the display 20d to display options of a commodity item. Examples of the commodity item options include T-shirts, mugs, photo books, and smartphone cases. When the user performs an operation of selecting a desired commodity item from the options, the processor 20a identifies the selected commodity item.

Subsequently, using the function of the design section 20a1, the processor 20a receives a selection of an object to be newly arranged (step S205). The processor 20a causes a screen for inputting image data to be displayed and obtains image data input by the user. For example, the user may cause image data desired for use for printing to be recorded in a portable terminal owned by himself, may cause the image data to be recorded in a cloud server, or may cause the image data to be recorded on a memory card or the like and to be brought into a store. In any case, the user performs an operation of transferring image data recorded on the various recording media to the user terminal 21, and thereby the processor 20a obtains the image data for an object to be arranged. The configuration may be such that user's original image data is obtained as mentioned above and a design described later is made, and may also be such that a designation of preset image data (for example, a stamp) held in advance on the design application side is received and the design described later is made using the preset image data. In addition, the processor 20a may be configured to cause the user to input any text and to select the font, size, and color, thereby obtaining a text object.

Subsequently, using the function of the design section 20a1, the processor 20a receives an operation on an object (step S210) and, using the functions of the three-dimensional display section 20a2 and the unrolled display section 20a3, the processor 20a causes the display 20d to display a three-dimensional preview and an unrolled preview in which the received operation is reflected (step S215). Subsequently, using the function of the design section 20a1, the processor 20a determines whether an operation of determining a design is performed (step S220), and if it is determined that the operation is performed, the design process in FIG. 6 terminates. The operation of determining a design may be assumed as, for example, a touch on a "Select" button included in the design screen. If another object is newly added, the processor 20a repeats step S205 and the subsequent steps. If an operation for an object already arranged is further performed, the processor 20a repeats step S210 and the subsequent steps.

Figure 7:
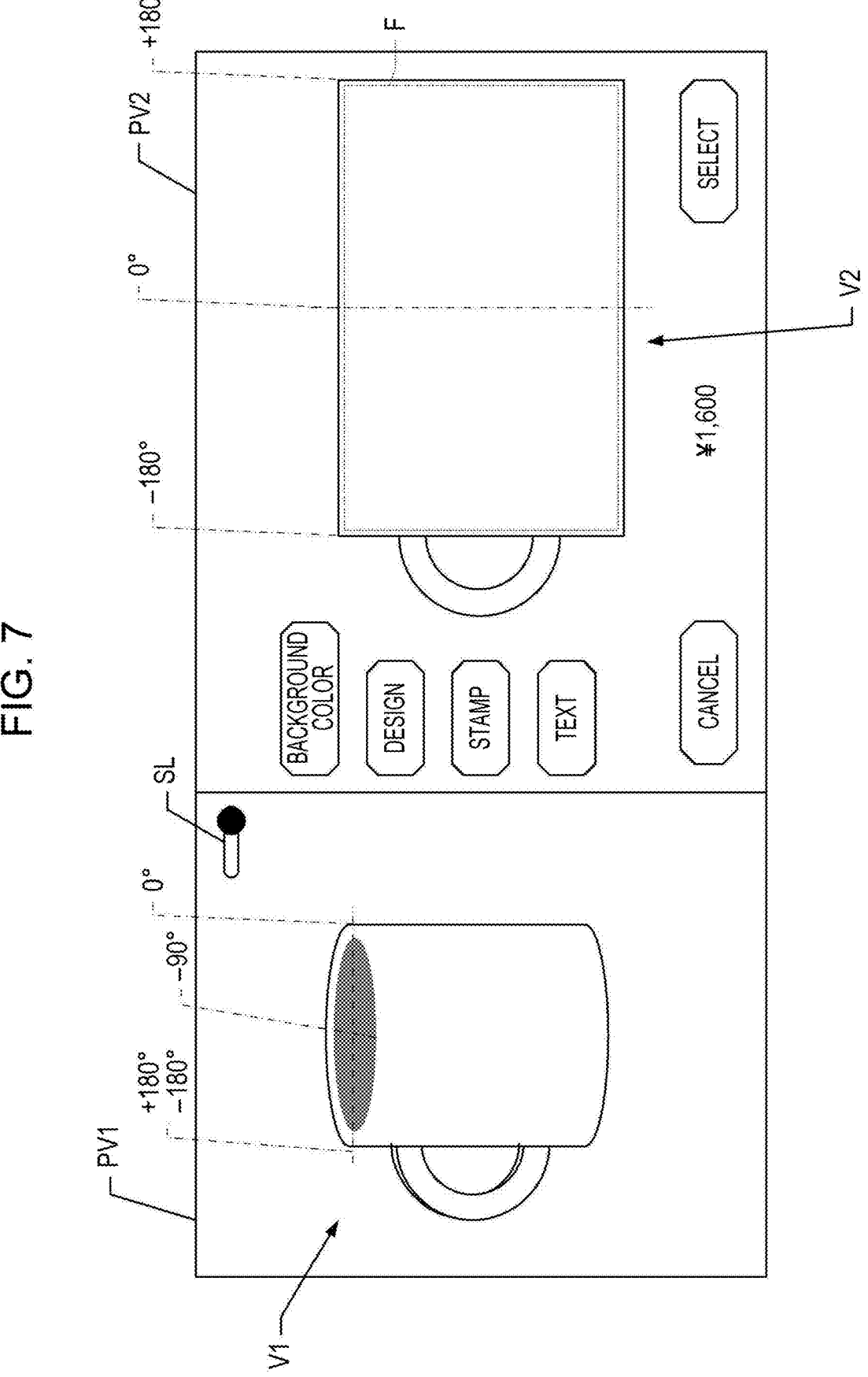
FIG. 7 depicts an example of a design screen.

The operation received at step S210 and the three-dimensional preview and the unrolled preview displayed at step S215 in response to the received operation are now described in detail. FIG. 7 depicts an example of a design screen displayed at step S215, which is an example of a design screen when a mug is selected as a commodity item. As depicted in FIG. 7, the design screen includes an unrolled preview portion PV2 and a three-dimensional preview portion PV1. The unrolled preview portion PV2, which is a portion caused to be displayed by the processor 20a by using the function of the unrolled display section 20a3, displays a mug such that the outer surface of the mug is unrolled flat. In the present embodiment, when a pattern is formed on the surface of the mug, the printing system 1 prints an image represented by design data on sublimation transfer paper by using the commodity item production printer 33. A printing operator pressure bonds printed sublimation transfer paper onto the outer side surface of the mug by using a mug-press machine to transfer the image represented by design data onto the mug, thereby forming an image on the mug. Therefore, an image displayed in an edit area F indicated by a dashed line of the unrolled preview V2 is a print preview of design data to be printed on sublimation transfer paper by the commodity item production printer 33.

The three-dimensional preview portion PV1 is a portion caused to be displayed by the processor 20a by using the function of the three-dimensional display section 20a2. The processor 20a causes an image based on the three-dimensional (3D) model data of a commodity item obtained at step S200, which is projected onto a predetermined projection plane when the 3D model is viewed from a predetermined viewpoint, to be displayed as a three-dimensional preview V1 in the three-dimensional preview portion PV1. Each location of the unrolled preview V2 (each location of design data) is associated with a respective location on the surface of a 3D model by using a UV map, and the processor 20a performs texturing on the surface of the 3D model based on the UV map and the design data and causes a three-dimensional preview to be displayed. As depicted in FIG. 7, using the functions of the three-dimensional display section 20a2 and the unrolled display section 20a3, the processor 20a causes both the three-dimensional preview portion PV1 and the unrolled preview portion PV2 to be simultaneously visibly displayed.

The user may perform a predetermined operation for either the three-dimensional preview portion PV1 or the unrolled preview portion PV2. Examples of the predetermined operation include an arrangement operation, an enlargement operation, a contraction operation, and a viewpoint change operation for an object represented by image data (hereafter referred to simply as an object). That is, the user may perform the predetermined operation mentioned above for the three-dimensional preview portion PV1 and may also perform the predetermined operation mentioned above for the unrolled preview portion PV2. The function of the design section 20a1 enables the processor 20a to receive the predetermined operation performed by the user for the three-dimensional preview portion PV1 or the unrolled preview portion PV2. Then, by using the functions of the three-dimensional display section 20a2 and the unrolled display section 20a3, the processor 20a causes a result of a predetermined operation performed by the user for either the three-dimensional preview portion PV1 or the unrolled preview portion PV2 to be reflected on both the three-dimensional preview portion PV1 and the unrolled preview portion PV2.

For example, when, by using the function of the design section 20a1, the processor 20a receives an arrangement operation of arranging an object on the unrolled preview V2, in response to the arrangement operation, by using the three-dimensional display section 20a2, the processor 20a switches the three-dimensional preview V1 displayed prior to the arrangement operation to the three-dimensional preview V1 viewed from a viewpoint at which a location of arrangement of the object is visible.

Figure 8:
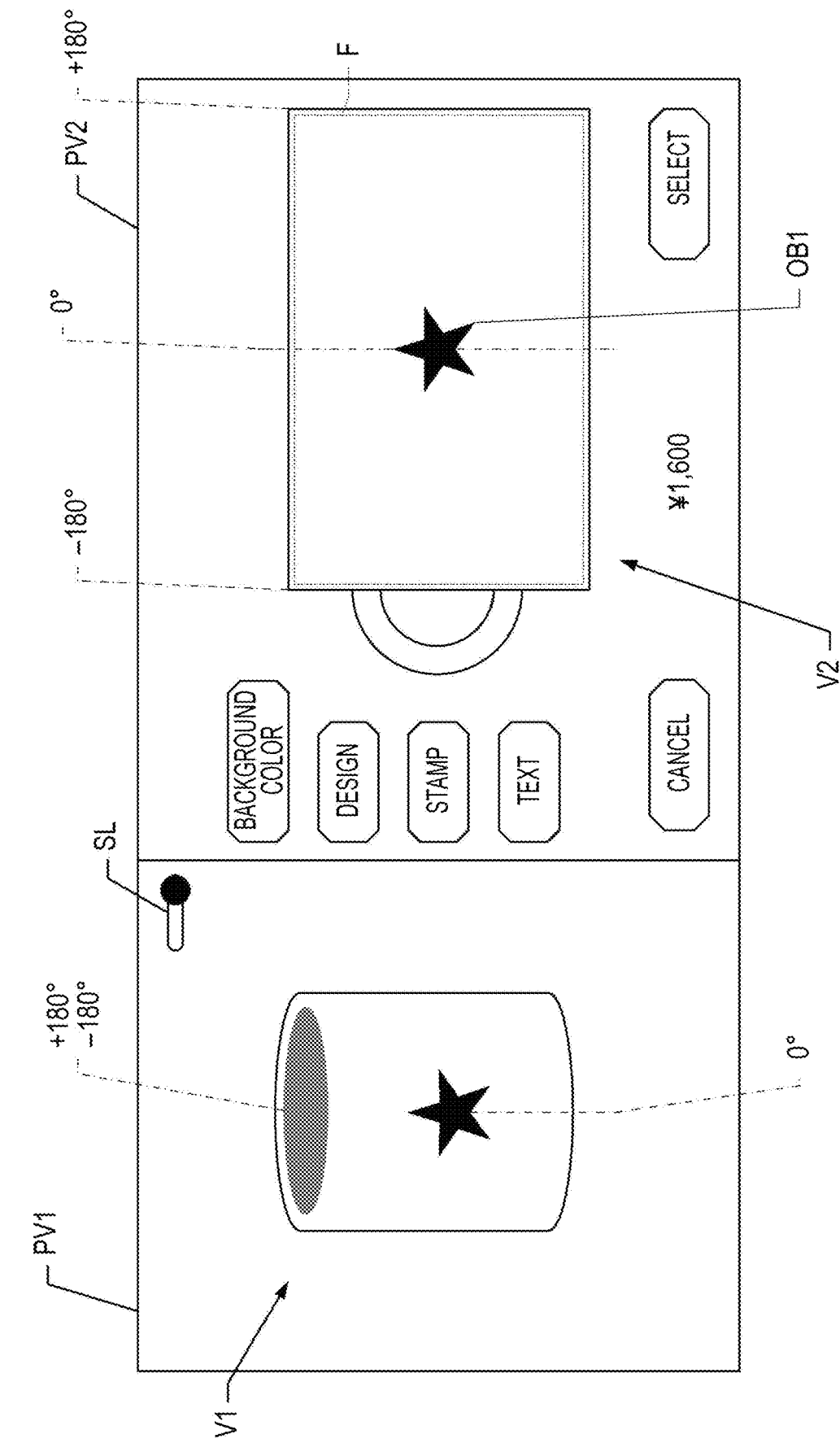
FIG. 8 depicts an example of changing the viewpoint of a three-dimensional preview in response to an operation onto an unrolled preview.

Specifically, as depicted in FIG. 7 and FIG. 8, the angles of a viewpoint for the 3D model are associated with the edit area F of two-dimensional design data. In this example, assuming that the center in the horizontal direction (the direction perpendicular to a direction corresponding to the height direction of a mug) of the edit area F is 0°, +180° is associated with the right end of the edit area F and −180°
associated with the left end. As depicted in FIG. 8, when the
object OB1 is newly arranged at, for example, a location of
0° in the edit area F, the processor 20a causes an image,
which is projected onto a projection plane when the 3D
model is viewed from a viewpoint at which the location of
0° is the front, to be displayed as the three-dimensional
preview V1 in the three-dimensional preview portion PV1.
Therefore, when, prior to arrangement of the object OB1, the
three-dimensional preview V1 viewed from a viewpoint at
which −90° is the front as depicted in FIG. 7, the object OB1
is arranged at the location of 0° of the unrolled preview V2.
As a result, the three-dimensional preview V1 is displayed
such that the three-dimensional preview V1 is rotated by 90°
as depicted in FIG. 8. According to the present embodiment,
such a viewpoint change is performed without a viewpoint
change operation for the three-dimensional preview V1, and
therefore the time and effort of the user may be reduced.

In contrast, when, by using the function of the design
section 20a1, the processor 20a receives an arrangement
operation of arranging an object on the unrolled preview V2,
in response to the arrangement operation, by using the
three-dimensional display section 20a2, the processor 20a
switches the display to an enlarged or contracted three-
dimensional preview if the object is not displayed in an
appropriate size, so that the object is displayed in an
appropriate size. In the present embodiment, the lower
threshold and the upper threshold of a size (height, width) in
the three-dimensional preview portion V1 of the object
when the object is arranged under the display conditions (the
distance between the viewpoint (camera) and the 3D model,
the multiplying factor in a zooming operation of a camera,
and so on) of the current three-dimensional preview V1 are
determined in advance, and if the size (height H, width W)
of the arranged object in the three-dimensional preview V1
is smaller than the lower threshold, the processor 20a
enlarges the display of the entire three-dimensional preview
V1 such that the size of the arranged object is larger than or
equal to the lower threshold and smaller than or equal to the
upper threshold. In addition, if the size of the arranged object
in the three-dimensional preview V1 is larger than the upper
threshold, the processor 20a contracts the display of the
entire three-dimensional preview V1 such that the size of the
arranged object is larger than or equal to the lower threshold
and smaller than or equal to the upper threshold. Specifi-
cally, for example, by changing the distance between the
viewpoint (camera) and the 3D model or changing the
multiplying factor in zooming of the camera, the processor
20a enlarges or contracts the display of the entire three-
dimensional preview V1 displayed in the three-dimensional
preview portion PV1.

Figure 9:
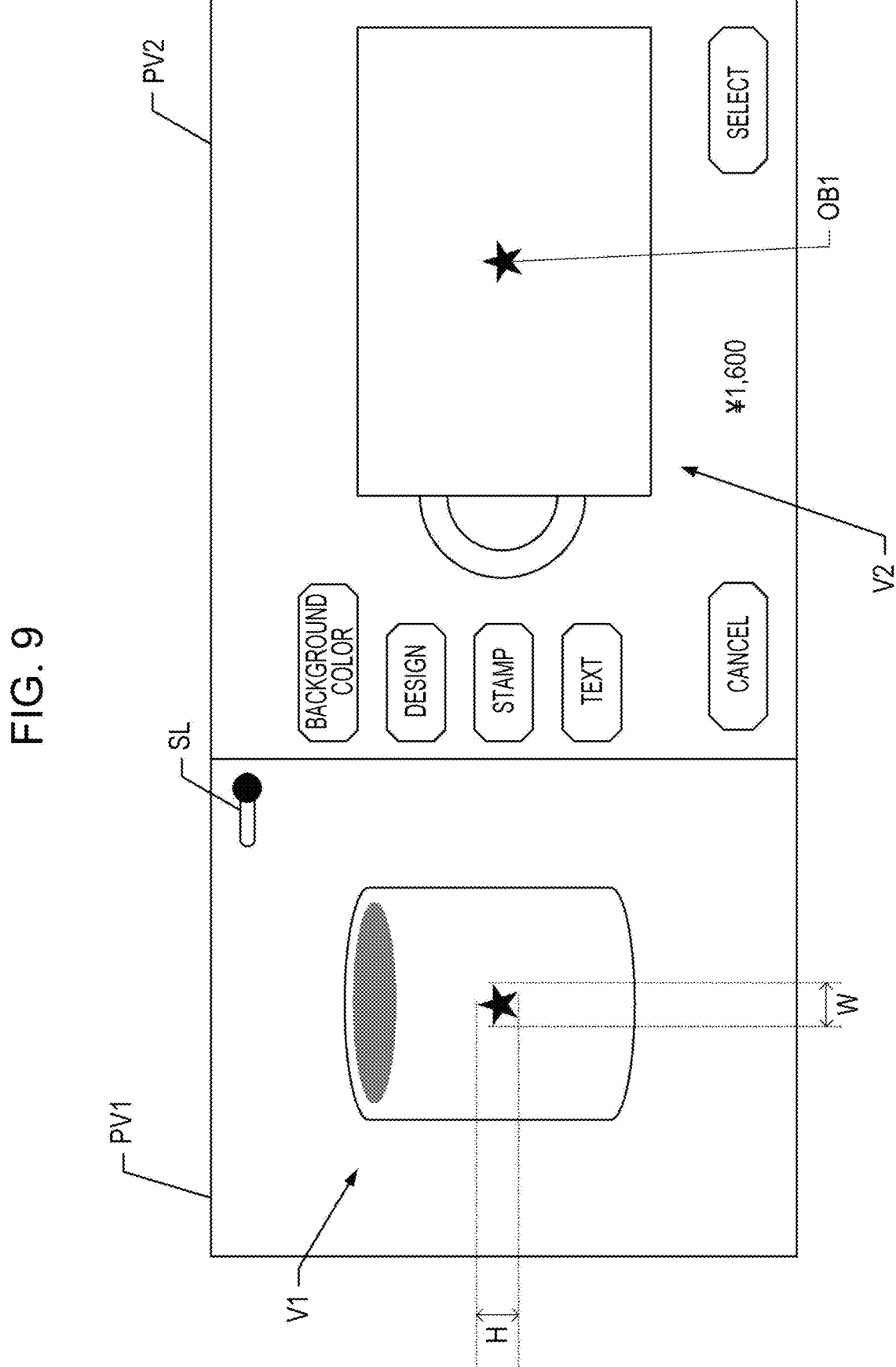
FIG. 9 depicts an example of enlarging the display of the three-dimensional preview in response to an operation onto the unrolled preview.
Figure 10:
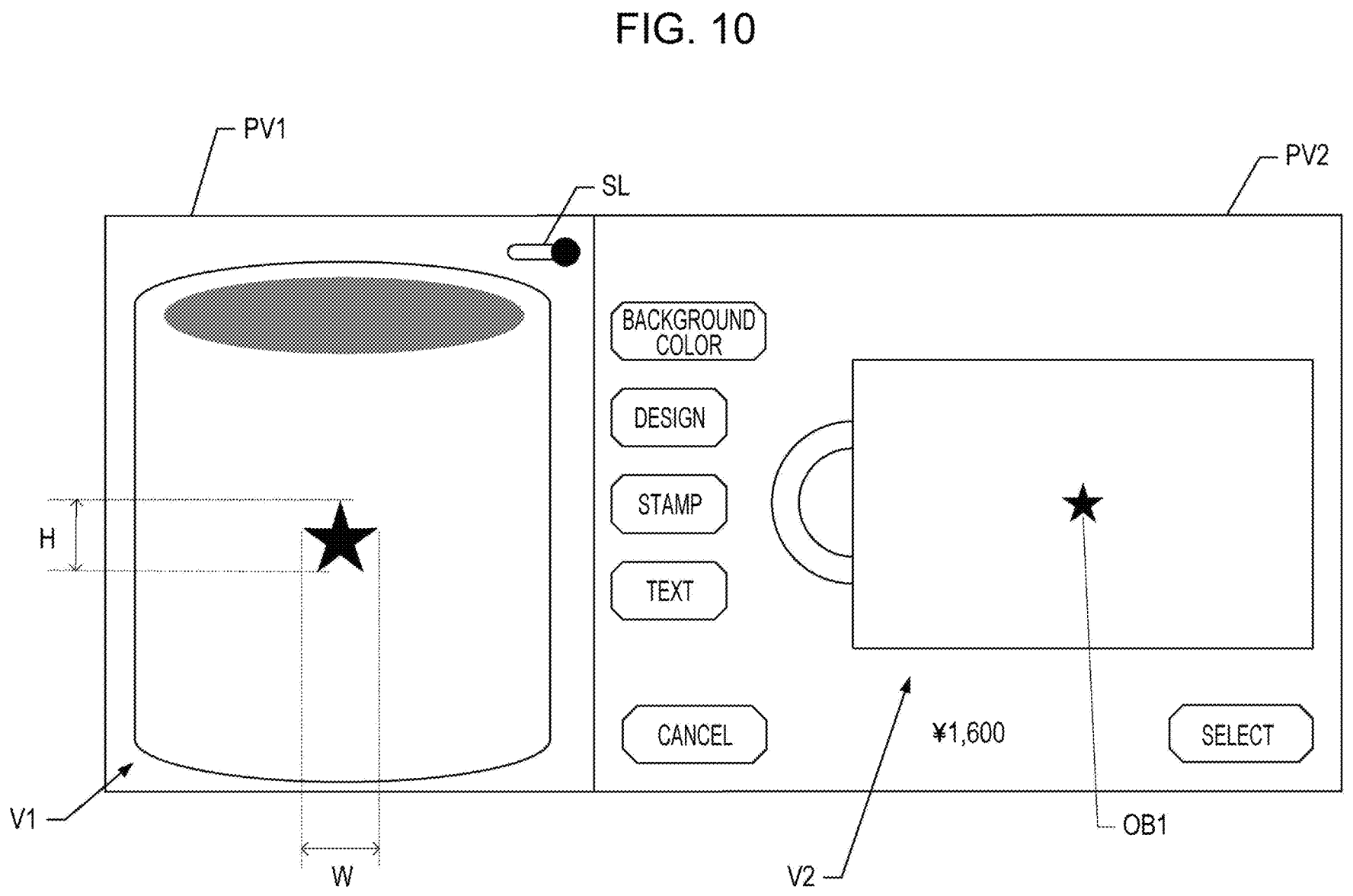

FIGS. 9 and 10 depict an example of enlarging the display
of the three-dimensional preview V1 in response to an
operation on the unrolled preview V2. FIG. 9 depicts the
state immediately after arranging the object OB1 on the
unrolled preview V2 (before enlarging the display). It is
assumed that the size (height H, width W) of the arranged
object in the three-dimensional preview V1, which corre-
sponds to the object OB1 in the unrolled preview V2, is
smaller than the lower threshold. FIG. 10 depicts the three-
dimensional preview V1 after the display has been enlarged.
As depicted in FIG. 10, the display of the three-dimensional
preview V1 is enlarged such that the three-dimensional
preview V1 is larger than that immediately after arrange-
ment of the object (FIG. 9), and therefore the user may
confirm the details of the arranged object in the three-
dimensional preview V1. In addition, since the three-dimensional preview V1 is enlarged without an enlargement
operation of the user on the three-dimensional preview V1,
the time and effort of the user may be reduced.

Figure 11:
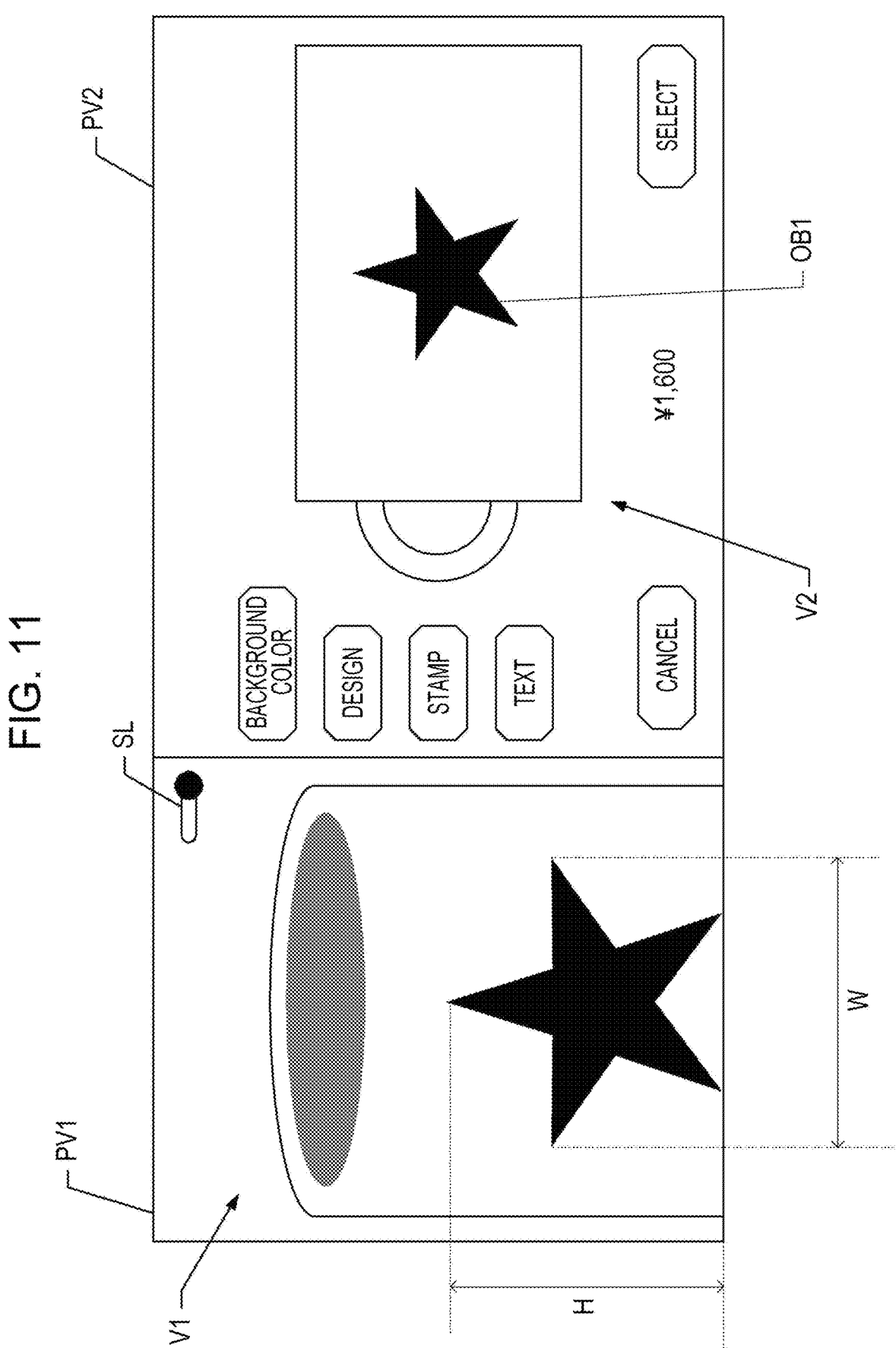
FIG. 11 depicts an example of contracting the display of the three-dimensional preview in response to an operation onto the unrolled preview.
Figure 12:
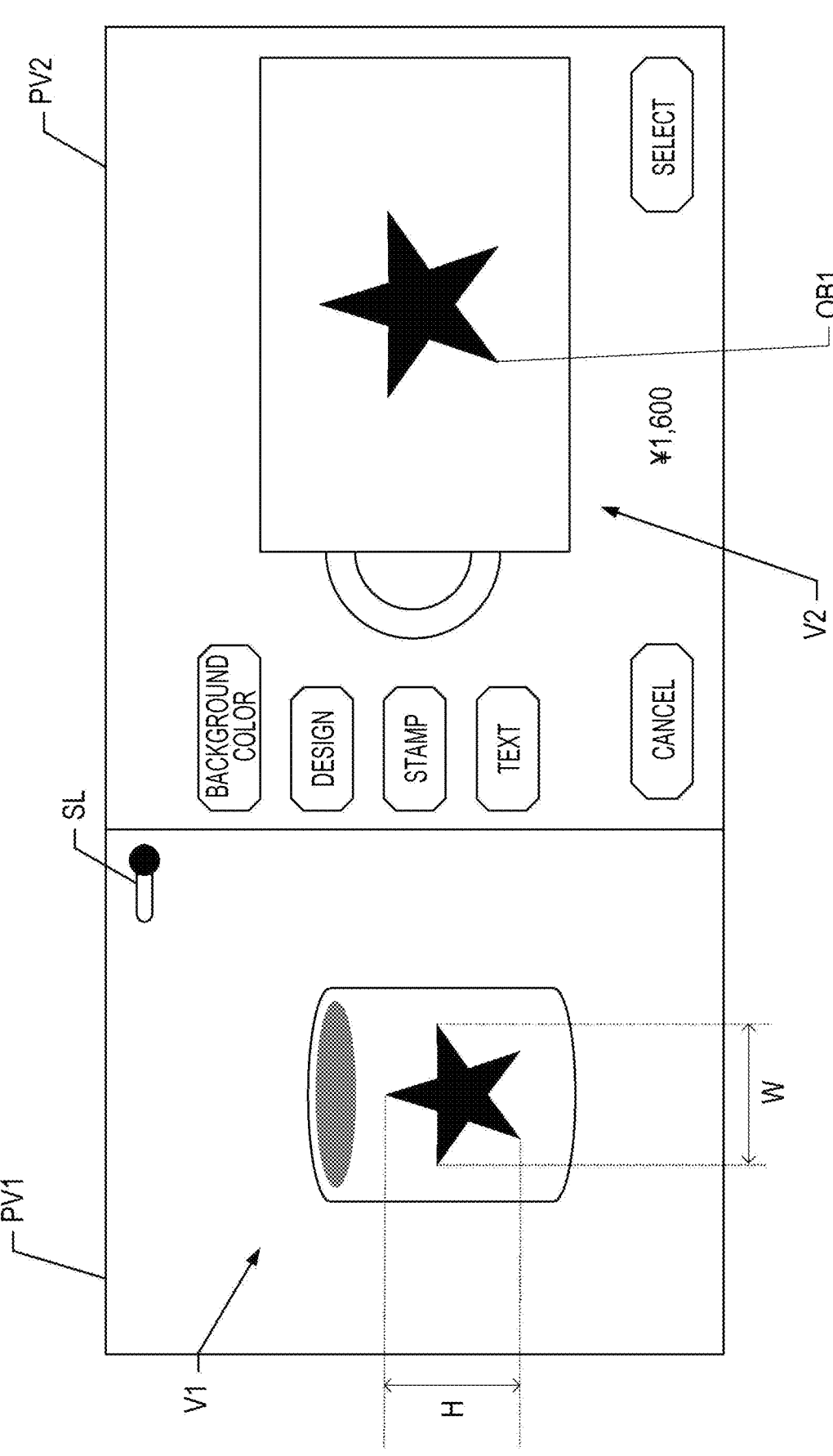
FIG. 12 depicts the example of contracting the display of the three-dimensional preview in response to the operation onto the unrolled preview.

FIGS. 11 and 12 depict an example of contracting the
display of the three-dimensional preview V1 in response to
an operation on the unrolled preview V2. FIG. 11 depicts the
state immediately after arranging the object OB1 on the
unrolled preview V2. It is assumed that the size (height H,
width W) of the object in the three-dimensional preview V1
is larger than the upper threshold. FIG. 12 depicts the
three-dimensional preview V1 after the display has been
contracted. As depicted in FIG. 12, the display of the
three-dimensional preview V1 is contracted such that the
three-dimensional preview V1 is smaller than that immedi-
ately after the display of the object in the three-dimensional
preview V1, and therefore the user may easily verify the
balance between the object in the three-dimensional preview
V1 and the entire three-dimensional preview V1. In addi-
tion, since the three-dimensional preview V1 is contracted
without a contraction operation of the user onto the three-
dimensional preview V1, the time and effort of the user may
be reduced.

In addition, when, by using the function of the design
section 20a1, the processor 20a receives an arrangement
operation of arranging an object on a three-dimensional
preview, in response to the arrangement operation, by using
the unrolled display section 20a3, the processor 20a
switches the display to an enlarged or contracted unrolled
preview if the object is not displayed in an appropriate size,
so that the object is displayed in an appropriate size. That is,
an arrangement operation for an object may be performed
onto the three-dimensional preview V1, and, when the
arrangement operation for an object is performed onto the
three-dimensional preview V1, the processor 20a causes the
object to be displayed at the corresponding location of the
unrolled preview V2 based on the UV map. The upper
threshold and the lower threshold of the size (height H,
width W) of an object in the unrolled preview V2 are
determined in advance, and if the size of the object displayed
in the unrolled preview V2 in response to the arrangement
operation on the three-dimensional preview V1 is smaller
than the lower threshold, the processor 20a enlarges the
display of the entire unrolled preview V2 such that the
display size of the object in the unrolled preview V2 is larger
than or equal to the lower threshold and smaller than or
equal to the upper threshold. In addition, if the size of the
object displayed in the unrolled preview V2 in response to
the arrangement operation on the three-dimensional preview
V1 is larger than the upper threshold, the processor 20a
contracts the display of the entire unrolled preview V2 such
that the display size of the object in the unrolled preview V2
is larger than or equal to the lower threshold and smaller than
or equal to the upper threshold.

Figure 13:
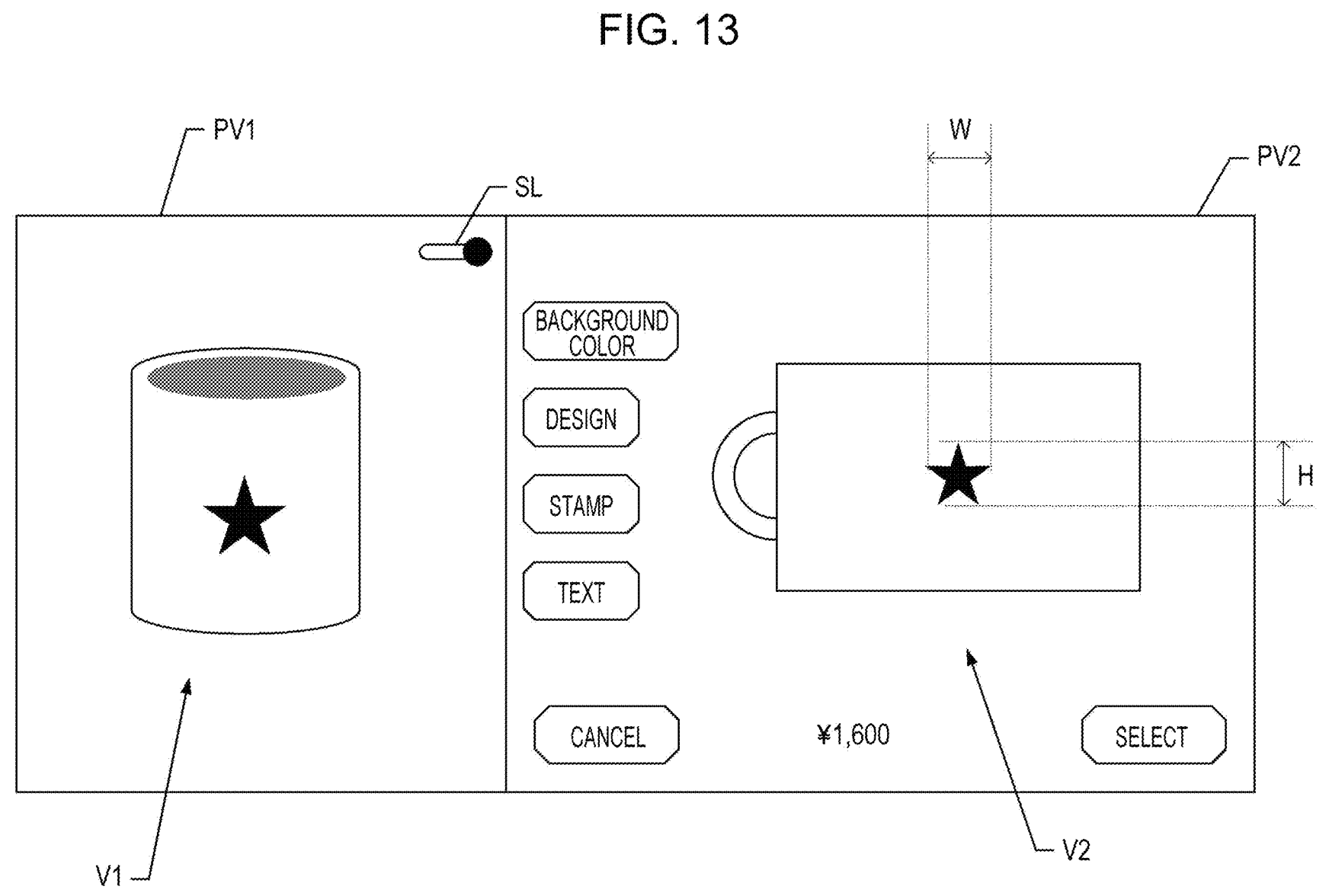
Figure 14:
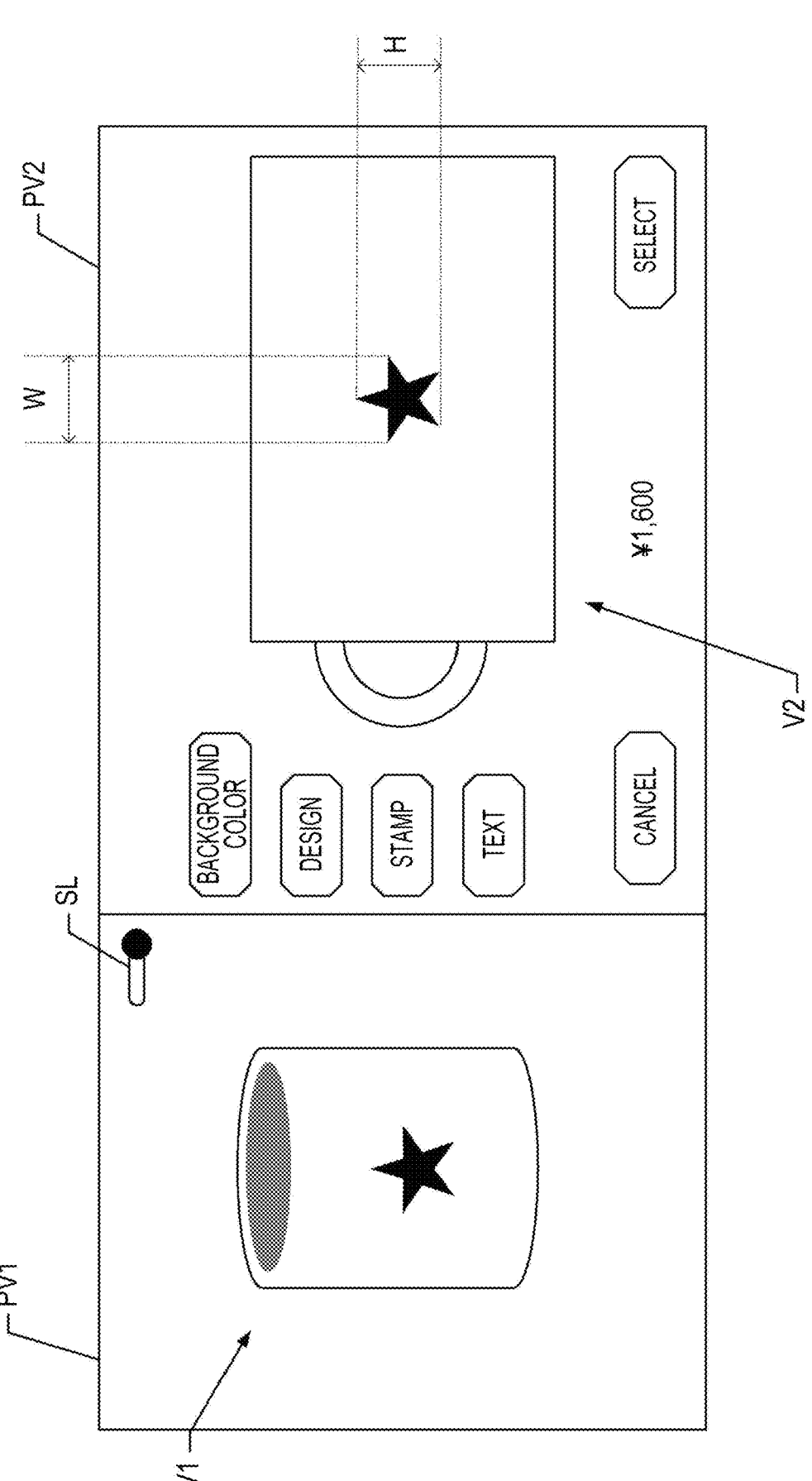
FIG. 14 depicts the example of enlarging the display of the three-dimensional preview in response to the operation onto the unrolled preview.

FIGS. 13 and 14 depict an example of enlarging the
display of the unrolled preview V2 in response to an
operation on the three-dimensional preview V1. FIG. 13
depicts the state immediately after an object has been
arranged on the three-dimensional preview V1. It is assumed
that the size (height H, width W) of the object displayed in
the unrolled preview V2 in response to the arrangement of
the object on the three-dimensional preview V1 is smaller
than the lower threshold. FIG. 14 depicts the unrolled
preview V2 after the display has been enlarged. As depicted
in FIG. 14, the display of the unrolled preview V2 is
enlarged such that the unrolled preview V2 is larger than that
immediately after the object has been displayed in the
unrolled preview V2 in response to the arrangement operation on the three-dimensional preview V1. Therefore, the user may confirm the details of the object in the unrolled preview V2. In addition, since the unrolled preview V2 is enlarged without an enlargement operation of the user onto the unrolled preview V2, the time and effort of the user may be reduced.

Although not illustrated in the figure, if the size of the object displayed in the unrolled preview V2 in response to the operation of arranging an object on the three-dimensional preview V1 is larger than the upper threshold, the processor 20a contracts the display of the entire unrolled preview V2 such that the display size of the object in the unrolled preview V2 is larger than or equal to the lower threshold and smaller than or equal to the upper threshold. This enables the user to easily verify the balance between the object in the unrolled preview V2 and the entire unrolled preview V2. In addition, since the unrolled preview V2 is contracted without a contraction operation of the user onto the unrolled preview V2, the time and effort of the user may be reduced.

In addition, when, by using the function of the design section 20a1, the processor 20a receives an operation of changing the display form onto one of the three-dimensional preview V1 and the unrolled preview V2, in response to the operation of changing the display form, the processor 20a changes the display form of the other of the three-dimensional preview V1 and the switches the unrolled preview V2. That is, by using the three-dimensional display section 20a2 and the unrolled display section 20a3, the processor 20a changes the display form of one preview display in response to the display form of the other preview display being changed by an operation of the user.

Figure 15:
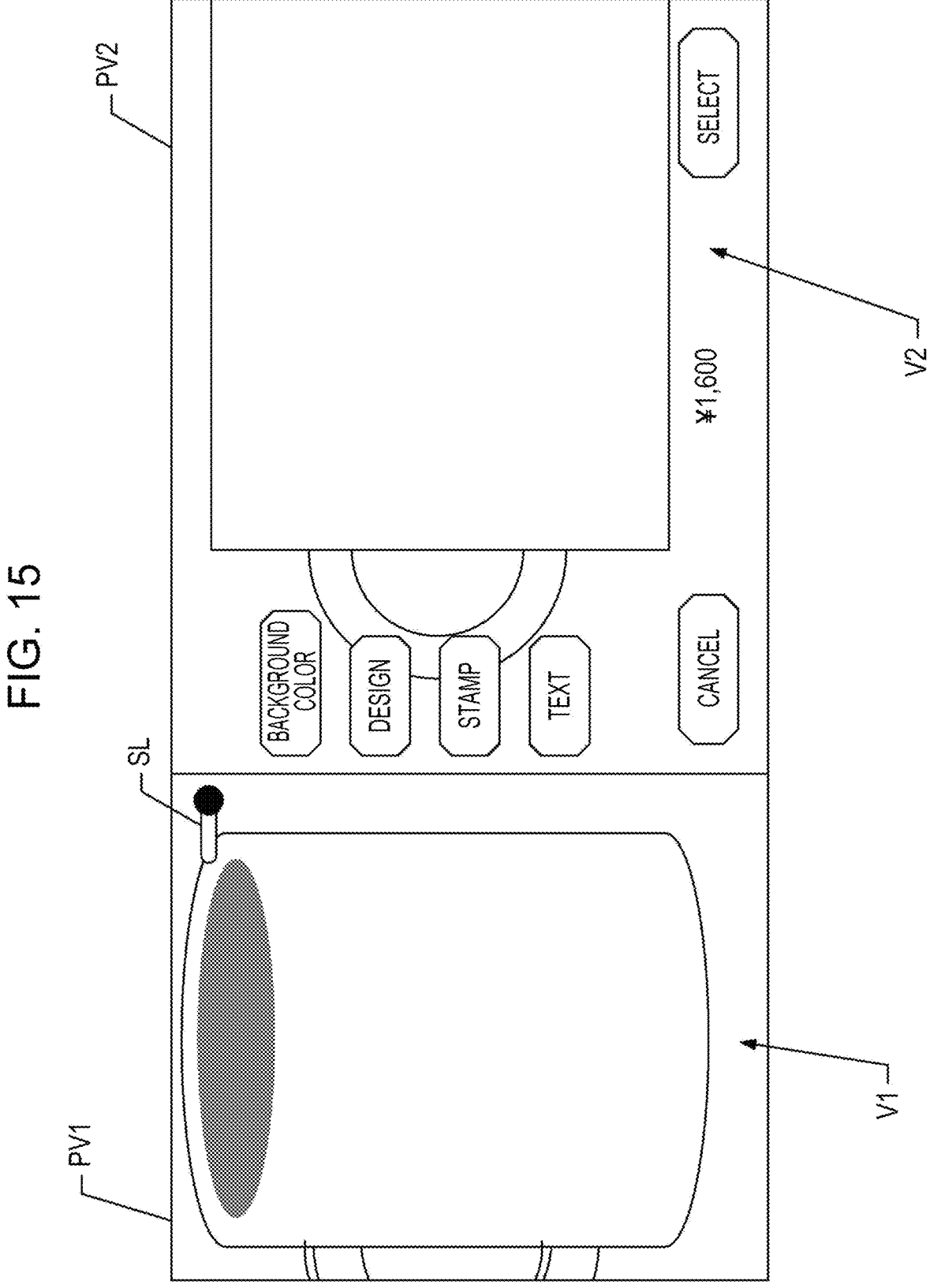
FIG. 15 depicts an example of enlarging the display of the three-dimensional preview in response to an operation onto the unrolled preview.

For example, as depicted in FIG. 15, when an operation (for example, a pinch-out operation) of enlarging the display is performed on the unrolled preview V2, the processor 20a identifies a portion of a 3D model corresponding to the display range of the unrolled preview V2 the display of which has been enlarged in response to the operation, based on the UV map, and enlarges the display of the portion in the three-dimensional preview V1. Although not illustrated in the figure, in response to a contraction operation (for example, a pinch-in operation) on the unrolled preview V2, the processor 20a identifies a portion of the 3D model corresponding to the display range of the unrolled preview V2 the display of which has been contracted by the contraction operation, and contracts the display of the three-dimensional preview V1 such that the portion is included in the three-dimensional preview V1.

Figure 16:
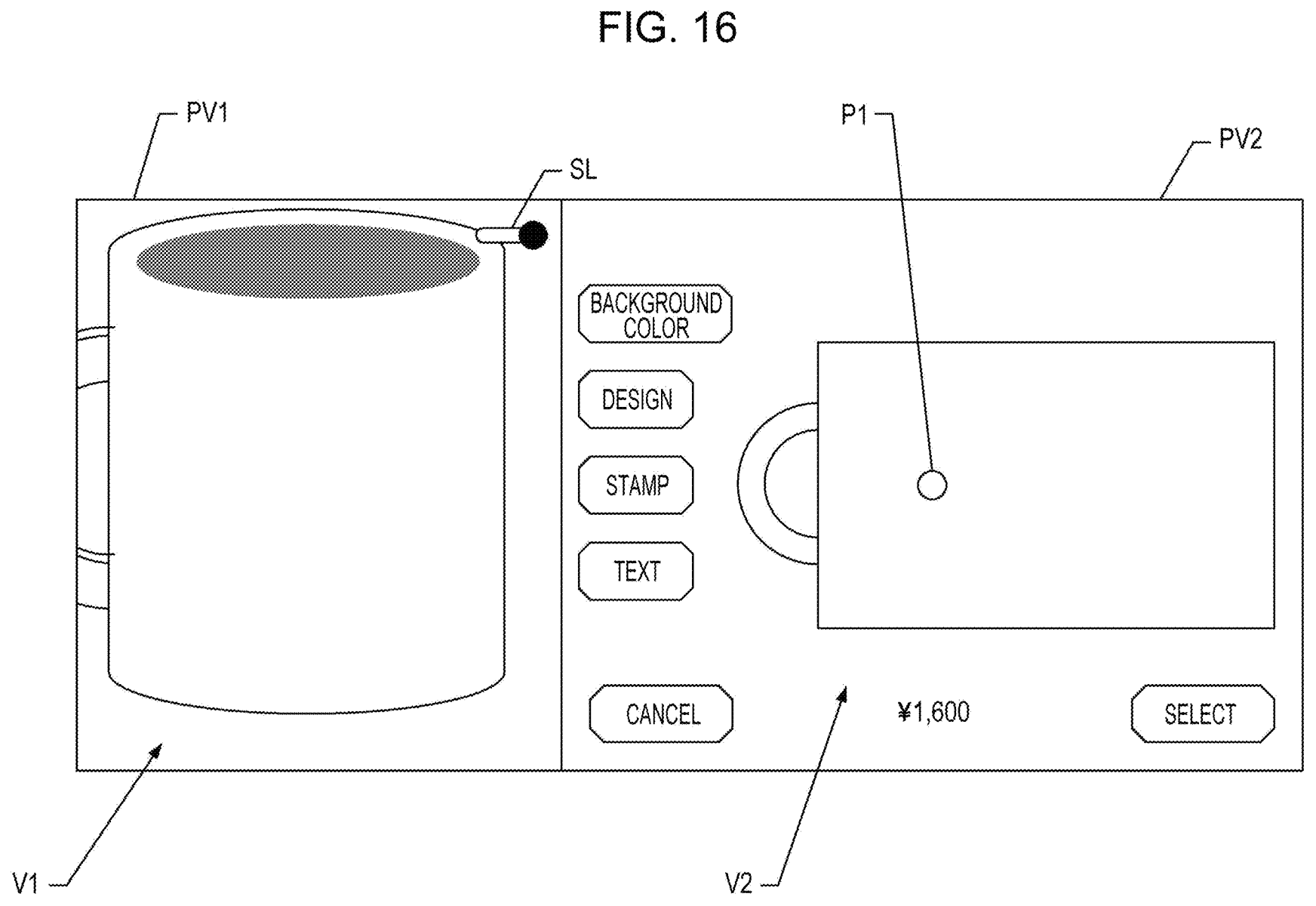

As depicted in FIG. 16, when an arbitrary location P1 of the unrolled preview V2 is double tapped, the processor 20a may be configured to identify a portion of a 3D model corresponding to the location P1 based on the UV map and to enlarge the display of the portion to a predetermined size in the three-dimensional preview V1. In addition, although not illustrated in the figure, when the display of the three-dimensional preview V1 is enlarged in response to double tapping on the unrolled preview V2 and then an arbitrary location of the unrolled preview V2 is double tapped again, the processor 20a may be configured to contract the display of the portion of the 3D model corresponding to the location at which the three-dimensional preview V1 is double tapped, such that the portion of the 3D model has the original size before the display enlargement.

Figure 17:
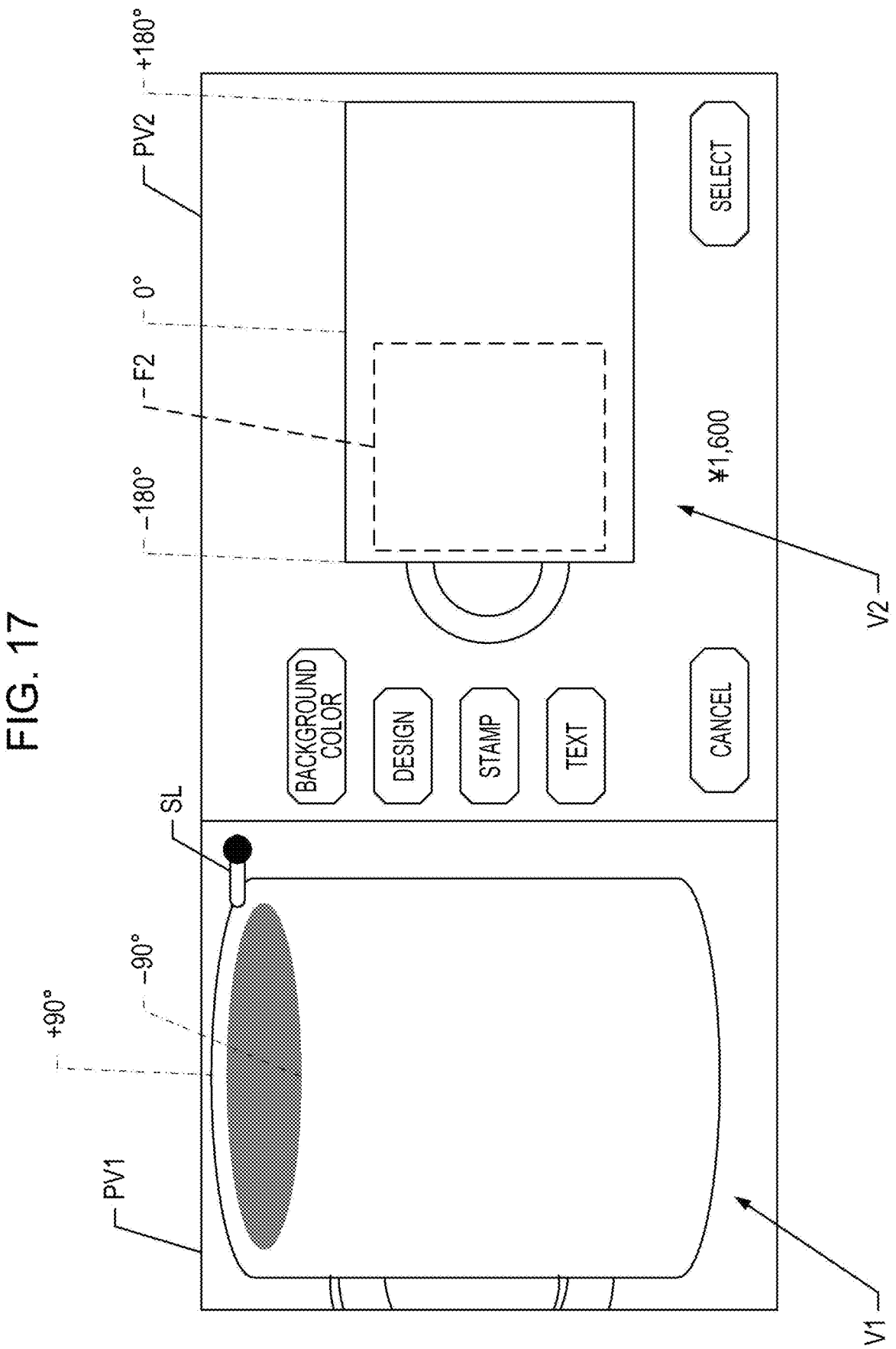
FIG. 17 depicts an example of displaying the area in question of the unrolled preview in response to an operation onto the three-dimensional preview.

Furthermore, as depicted in FIG. 17, when an enlargement operation is performed on the three-dimensional preview V1, the processor 20a enlarges the display of the three-dimensional preview V1 in response to the enlargement operation, identifies an area of the unrolled preview V2 corresponding to a portion displayed in the three-dimensional preview V1 after the expansion, based on the UV map, and causes a frame F2 indicating the area to be displayed. This enables the user to recognize what range of the unrolled preview V2 corresponds to the range displayed in the three-dimensional preview V1.

Figure 18:
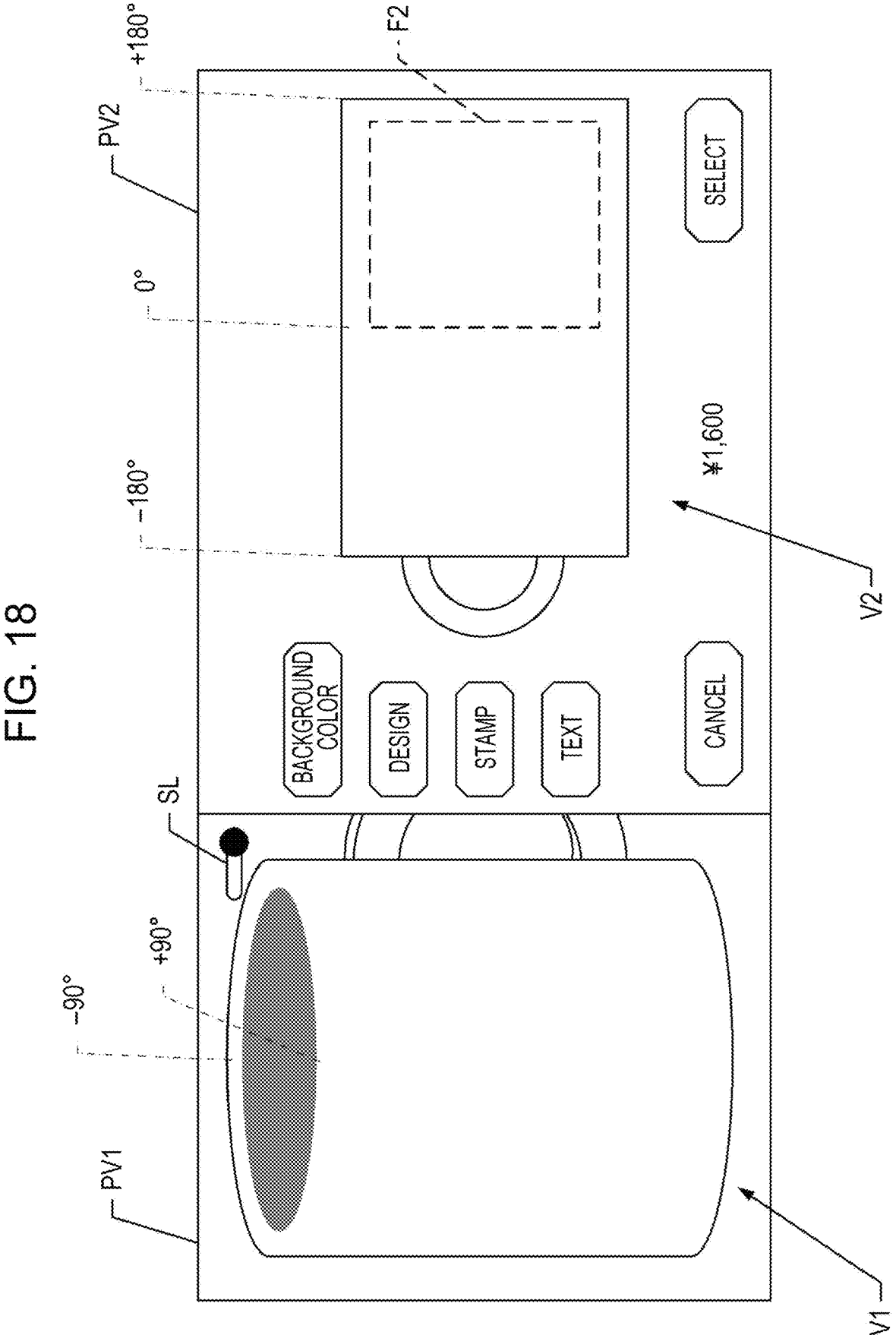
FIG. 18 depicts an example of switching the unrolled preview in response to a change of the viewpoint of the three-dimensional preview.

Furthermore, as depicted in FIG. 18, when an operation of changing the viewpoint of the 3D model is performed on the three-dimensional preview V1, the processor 20a causes an image, which is projected onto a predetermined projection plane when the 3D model is viewed from a changed viewpoint, to be displayed as the three-dimensional preview V1. Then, the processor 20a causes the unrolled preview V2 corresponding to the three-dimensional preview V1 to be displayed. FIG. 18 depicts an example in which the viewpoint is changed from the state in FIG. 17 to a viewpoint at which the front is opposite (location of +90°) to the front of the three-dimensional preview V1 in FIG. 17.

In such a manner, when the display form (the preview size, the viewpoint of a three-dimensional preview, and so on) of one preview is changed, the display form of the other preview is also changed, and therefore it is unnecessary for a user to perform an operation of changing the display form of the other preview. Therefore, the time and effort of the user may be reduced.

In the present embodiment, a setting object SL that switches between on and off of the preview follow function mentioned above, that is, a function of reflecting a result of an operation of a user on either the three-dimensional preview V1 or the unrolled preview V2 on both previews is provided on the preview screen. In the present embodiment, the preview follow function mentioned above is implemented when the setting object SL is on. When the preview follow function is off, the processor 20a does not cause a result of one preview to be reflected on the other preview. For example, in some cases, such as the case where a plurality of objects are to be arranged apart, it is desirable that the user turn off the preview follow function. In such a case, if, each time an operation of finely adjusting the location or the size of one object is performed on the unrolled preview V2, the preview is switched to the three-dimensional preview V1 from a viewpoint at which the object is viewed from the front, the balance between the object and another object is considered to be unlikely to be verified. Therefore, in such a case, by turning off the follow function, the user may adjust the arrangement among objects while visually recognizing the three-dimensional preview V1 that does not follow an operation on the unrolled preview V2. The form of the setting object SL that switches between on and off of the follow function is exemplary, and the setting object SL may be disposed in the three-dimensional preview portion PV1 as depicted in FIG. 18 or may be disposed in the unrolled preview portion PV2. In addition, for example, the setting object SL may be provided as one item in the setting menu.

As described above, according to the present embodiment, a design device that enables a user who is not accustomed to designing a pattern to be formed on the surface of a three-dimensional object to easily design the pattern may be provided.

3. OTHER EMBODIMENTS

The embodiment described above is an example for carrying out the present disclosure, and other various embodiments may be employed. Printing may be performed directly on a dimensional commodity item, or may not be performed directly. As the latter case, the configuration in which a print is produced, for example, by transferring an image printed on a flat-surface print medium onto a commodity item is assumed. Although the manner of forming an image on a commodity item is arbitrary, printing is used at any of the stages of the process. The commodity item is any material as long as an image may be formed on the material. The material of a commodity item is not limited.

In the embodiment described above, an example in which a mug is selected as a commodity item for designing is described; however, the techniques of the present disclosure may be applied to the cases of designing other prints for smartphone cases, T-shirts, pinback buttons, photo albums, and so on. The three-dimensional preview of, for example, a T-shirt may be displayed using 3D model data indicating a state in which a dummy, which is a replica of a human being and is used for, for example, sale of cloths, wears the T-shirt.

The three-dimensional previews of a sheet-like commodity item (for example, paper or cloth) viewed from various viewpoints and the unrolled preview in which the printing surface of the sheet-like commodity item is mapped on a two-dimensional plane may be simultaneously displayed.

The unrolled preview is not necessarily displayed for all the surfaces of a commodity item and may be any unrolled preview as long as it is displayed for at least one surface on which design may be made. For example, the back surface of a sheet-like commodity item and the inner wall surface of a base or a cup are not necessarily displayed.

Figure 19:
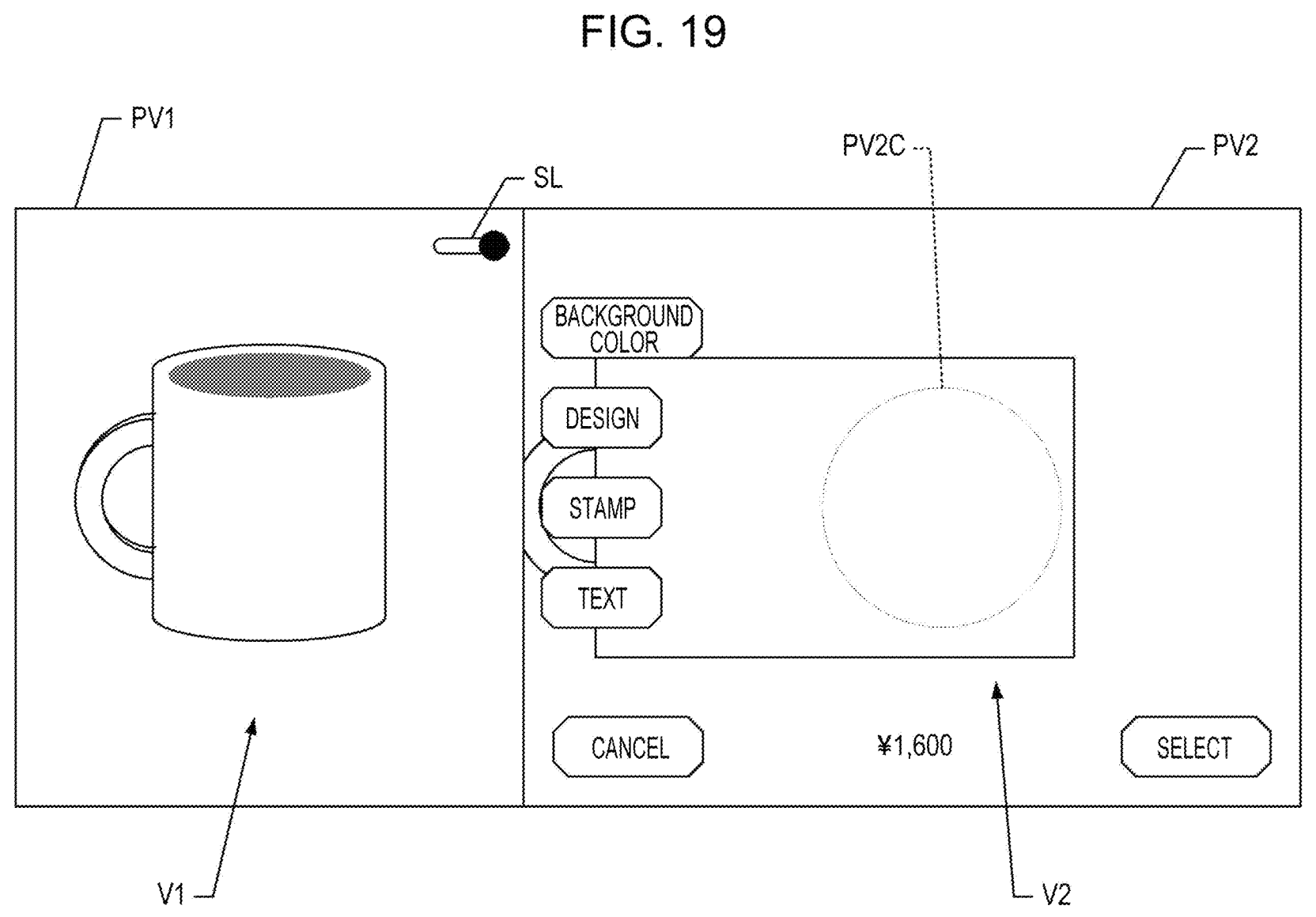
Figure 20:
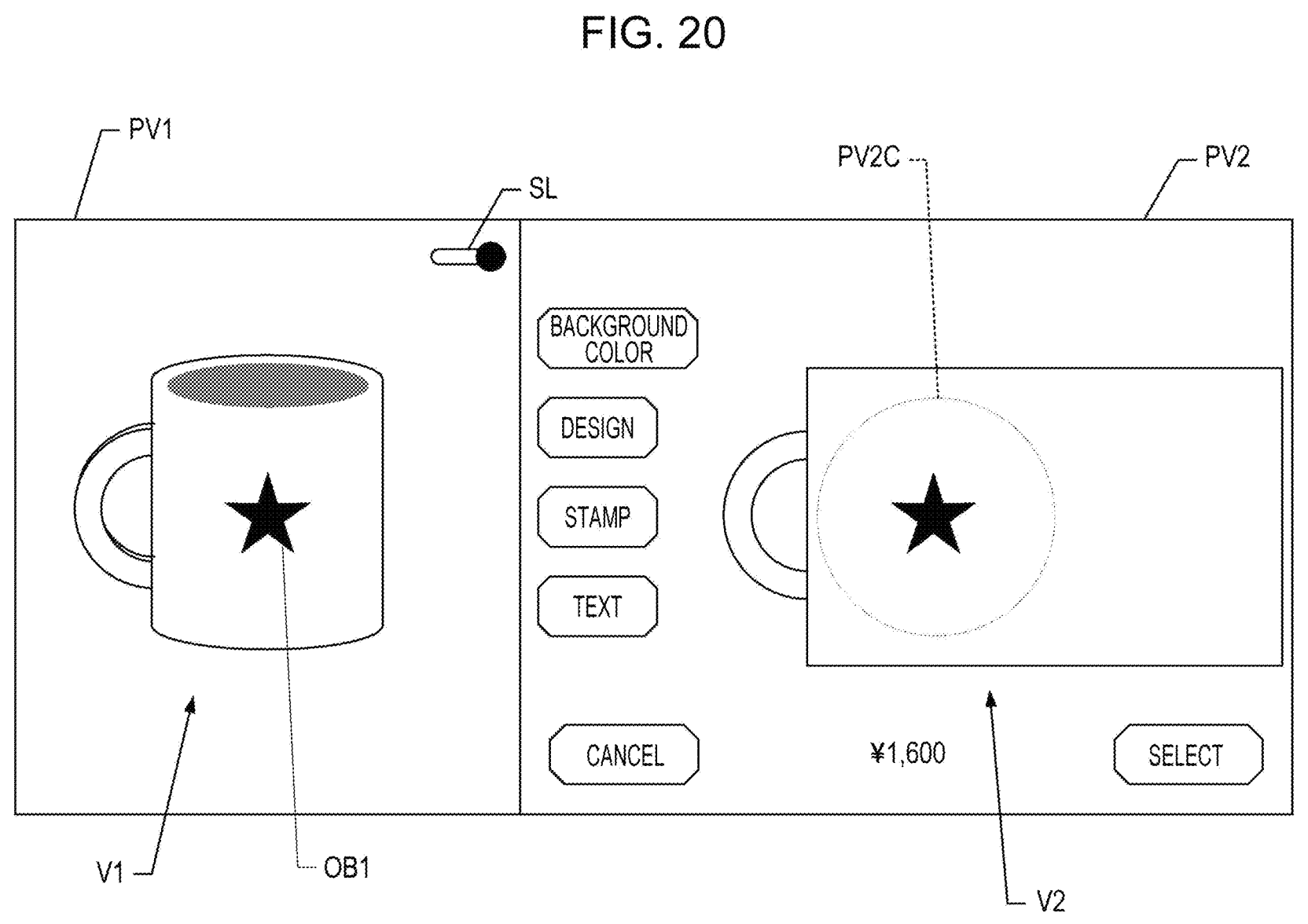

In addition, when, by using the function of the design section 20a1, the processor 20a receives an arrangement operation of arranging an object on the three-dimensional preview V1, in response to the arrangement operation, by using the function of the unrolled display section 20a3, the processor 20a may be configured to switch the display of the unrolled preview V2 such that the arrangement location of the object is a center portion PV2C of the unrolled preview portion PV2. The location and the size of the center portion PV2C of the unrolled preview portion PV2 are determined in advance relative to the unrolled preview portion PV2 in accordance with the shape and the size of the unrolled preview portion PV2. FIGS. 19 and 20 depict an example of changing the display location of the unrolled preview V2 in response to an arrangement operation on the three-dimensional preview V1. FIG. 19 depicts the three-dimensional preview portion PV1 and the unrolled preview portion PV2 before arrangement of an object on the three-dimensional preview v1. In the example in FIG. 19, a left portion of the unrolled preview V2 is displayed to the left of the center portion PV2C of the unrolled preview portion PV2. When the object OB1 is arranged on the three-dimensional preview V1 as depicted in FIG. 20 while the unrolled preview V2 is displayed in the unrolled preview portion PV2 in such a manner, the processor 20a identifies the location in the unrolled preview V2 corresponding to the arrangement location in the three-dimensional preview V1, based on the UV map. If the location is not in the center portion PV2C of the unrolled preview portion PV2, the processor 20a moves the display location of the entire unrolled preview V2 such that the entire unrolled preview V2 is located in the center portion PV2C as depicted in FIG. 20.

All types of the follow functions described in the above embodiments may be employed in the design device, or at least one type of the follow functions may be selected and employed.

In addition, in the embodiments described above, an example in which an operation of arranging an object on one preview triggers the operation content to be followed by the other preview is illustrated; however, the operation acting as a trigger is not limited to the arrangement operation. For example, an operation of moving an object after the arrangement or an operation of enlarging, contracting, or transforming the object after the arrangement may act as a trigger. In addition, an operation of changing the object from a non-selection state to a selection state may act as a trigger. Operations of adding various edits, such as effects, to an object may act as triggers.

Furthermore, the present disclosure is applicable as a computer-executable program and a method. A production method includes receiving an operation of a user, causing a display device to display a three-dimensional preview of a designed print when viewed from a predetermined viewpoint, causing the display device to display an unrolled preview of the designed print mapped onto a two-dimensional plane, receiving a production start instruction of the user, and producing the print designed according to the production start instruction of the user by controlling a production device. In the production method, both the three-dimensional preview and the unrolled preview are displayed simultaneously visibly, and a result of a predetermined operation of a user performed on one of the three-dimensional preview and the unrolled preview is reflected on both the three-dimensional preview and the unrolled preview. The display device that displays a three-dimensional preview and the display device that displays an unrolled preview are not limited to being the same device and may be configured as separate devices if the devices are within sight of a user. In addition, a design device that receives a design of a user and the display device may be the same device or may be configured as separate devices. In addition, the production device may be directly controlled from the design device via a network or may be indirectly controlled via another device (a server, a staff terminal, a print job management terminal, an operator terminal, or the like). The design device (a terminal) and the production device (a printer, a back-process machine, a front-process machine, or the like) may be configured to be not installed in a store that is visited by a user. The design device may be installed in a store, the production device may be installed in a printing facility of a printing company, and the print may be delivered from the printing facility to a client. In addition, the design device may not be installed in a store and may be configured as a portable terminal that enables a user to place an order, edit design data, and issue a final printing instruction from various places.

A non-transitory computer-readable storage medium storing a design program that causes a computer to execute a design function of receiving a design of a user, a three-dimensional display function of causing a display device to display a three-dimensional preview of a designed print when viewed from a predetermined viewpoint, an unroll display function of causing the display device to display an unrolled preview of the designed print mapped onto a two-dimensional plane, a reception function of receiving a production start instruction of a user, and a production function of causing a production device to produce the print designed according to the production start instruction of the user. In the design program, both the three-dimensional preview and the unrolled preview are displayed simultaneously visibly, and a result of a predetermined operation of a user performed on one of the three-dimensional preview and the unrolled preview is reflected on both the three-dimensional preview and the unrolled preview.

In addition, a system, a storage medium, and a method as described above are implemented as a single device in some cases and are implemented using parts included in a plurality of devices in other cases, and include various aspects. In addition, the present disclosure may be changed as appropriate, such as being implemented partially as software and partially as hardware. Furthermore, the present disclosure is formed as a recording medium on which a program for controlling a system is recorded. The recording medium on which the program is recorded may be a magnetic recording medium or a semiconductor memory, and exactly the same consideration may be applied to any recording medium that would be developed in the future.

What is claimed is:

1. A design device for designing a print, comprising:
a processor configured to:
  design the print according to an instruction of a user;
  control a display device to display:
    a three-dimensional preview of the designed print viewed from a predetermined viewpoint, and
    an unrolled preview of the designed print mapped onto a two-dimensional plane, wherein
      the three-dimensional preview and the unrolled preview are simultaneously visibly displayed on the display device;
  receive a first arrangement operation of arranging a first object on the unrolled preview;
  control, based on the first arrangement operation and when a size of the first object is smaller than a first threshold, the display device to switch display to the three-dimensional preview that is enlarged such that the size of the first object is larger than or equal to the first threshold; and
  control, based on the first arrangement operation and when the size of the first object is larger than a second threshold, the display device to switch display to the three-dimensional preview that is reduced such that the size of the first object is smaller than or equal to the second threshold, wherein
    the first threshold is smaller than the second threshold.

2. The design device according to claim 1, wherein the processor is further configured to control, based on the first arrangement operation, the display device to switch display to the three-dimensional preview viewed from a viewpoint at which a location of arrangement of the first object is visible.

3. The design device according to claim 1, wherein the processor is further configured to:
  receive a second arrangement operation of arranging a second object on the three-dimensional preview; and
  control, based on the second arrangement operation, the display device to switch display of the unrolled preview such that an arrangement location of the second object is in a center portion of the unrolled preview.

4. The design device according to claim 1, wherein the processor is further configured to:
  receive a second arrangement operation of arranging a second object on the three-dimensional preview;
  control, based on the second arrangement operation and when a size of the second object is smaller than a third threshold, the display device to switch display to the unrolled preview that is enlarged such that the size of the second object is larger than or equal to the third threshold; and control, based on the second arrangement operation and when the size of the second object is larger than a fourth threshold, the display device to switch display to the unrolled preview that is reduced such that the size of the second object is smaller than or equal to the fourth threshold, and the fourth threshold is smaller than the third threshold.

5. The design device according to claim 1, wherein the processor is further configured to control the display device to one of:
  change a display form of the three-dimensional preview in response to a display form of the unrolled preview being changed by a first operation of the user, or
  change the display form of the unrolled preview in response to the display form of the three-dimensional preview being changed by a second operation of the user.

6. The design device according to claim 1, wherein the processor is further configured to set whether a result of an operation performed on one of the three-dimensional preview or the unrolled preview by the user is to be reflected on each of the three-dimensional preview and the unrolled preview.

7. A production method, comprising:
  designing a print according to an instruction of a user;
  controlling a display device to display a three-dimensional preview of the designed print viewed from a predetermined viewpoint;
  controlling the display device to display an unrolled preview of the designed print mapped onto a two-dimensional plane, wherein
    the three-dimensional preview and the unrolled preview are simultaneously visibly displayed on the display device;
  receiving a first arrangement operation of arranging a first object on the unrolled preview;
  controlling, based on the first arrangement operation and when a size of the first object is smaller than a first threshold, the display device to switch display to the three-dimensional preview that is enlarged such that the size of the first object is larger than or equal to the first threshold; and
  controlling, based on the first arrangement operation and when the size of the first object is larger than a second threshold, the display device to switch display to the three-dimensional preview that is reduced such that the size of the first object is smaller than or equal to the second threshold, wherein
    the first threshold is smaller than the second threshold.

8. A non-transitory computer-readable medium stored thereon, computer-executable instructions which, when executed by a processor, cause the processor to execute operations, the operations comprising:
  designing a print according to an instruction of a user;
  controlling a display device to display a three-dimensional preview of the designed print viewed from a predetermined viewpoint;
  controlling the display device to display an unrolled preview of the designed print mapped onto a two-dimensional plane, wherein
    the three-dimensional preview and the unrolled preview are simultaneously visibly displayed on the display device; and
  receiving a first arrangement operation of arranging a first object on the unrolled preview;
  controlling, based on the first arrangement operation and when a size of the first object is smaller than a first threshold, the display device to switch display to the three-dimensional preview that is enlarged such that the size of the first object is larger than or equal to the first threshold; and controlling, based on the first arrangement operation and when the size of the first object is larger than a second threshold, the display device to switch display to the three-dimensional preview that is reduced such that the size of the first object is smaller than or equal to the second threshold, wherein the first threshold is smaller than the second threshold.

\* \* \* \* \*